(12) United States Patent
Sakumoto et al.

(10) Patent No.: US 10,447,673 B2
(45) Date of Patent: Oct. 15, 2019

(54) INFORMATION PROCESSING APPARATUS, INFORMATION PROCESSING METHOD, AND COMPUTER PROGRAM

(71) Applicant: SONY CORPORATION, Tokyo (JP)

(72) Inventors: Koichi Sakumoto, Tokyo (JP); Taizo Shirai, Kanagawa (JP); Yohei Kawamoto, Tokyo (JP); Yu Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 97 days.

(21) Appl. No.: 14/910,500

(22) PCT Filed: Jul. 17, 2014

(86) PCT No.: PCT/JP2014/069063
§ 371 (c)(1),
(2) Date: Feb. 5, 2016

(87) PCT Pub. No.: WO2015/019821
PCT Pub. Date: Feb. 12, 2015

(65) Prior Publication Data
US 2016/0182476 A1 Jun. 23, 2016

(30) Foreign Application Priority Data
Aug. 5, 2013 (JP) .................. 2013-162282

(51) Int. Cl.
*H04L 29/06* (2006.01)
(52) U.S. Cl.
CPC ........ *H04L 63/062* (2013.01); *H04L 63/0861* (2013.01)
(58) Field of Classification Search
USPC ............ 726/2, 6, 21, 36; 713/150, 163, 181; 380/255, 264, 276
See application file for complete search history.

(56) References Cited

U.S. PATENT DOCUMENTS

| 2008/0256626 A1* | 10/2008 | Masui ............... H04L 9/0897 726/20 |
| 2010/0088519 A1* | 4/2010 | Tsuruoka ............... G06F 21/33 713/176 |
| 2013/0290718 A1* | 10/2013 | Zhuang .............. G06Q 20/10 713/168 |

FOREIGN PATENT DOCUMENTS

| JP | 61-296487 | 12/1986 |
| JP | 2000-227755 A | 8/2000 |

(Continued)

OTHER PUBLICATIONS

Feb. 23, 2017, EP communication issued for related EP application No. 14835331.1.

(Continued)

*Primary Examiner* — Sharif E Ullah
(74) *Attorney, Agent, or Firm* — Paratus Law Group, PLLC

(57) ABSTRACT

To be capable of guaranteeing security without dependency on a distance of wireless communication while maintaining convenience of a key apparatus, there is provided an information processing apparatus including: a key storage unit configured to retain one or more secret keys corresponding to one or more respective public keys; and a key use permission state storage unit configured to store presence or absence of use permission of each of the one or more secret keys. For at least any of the one or more secret keys, a switch between the presence and absence of the use permission stored by the key use permission state storage unit is possible.

19 Claims, 16 Drawing Sheets

(56) References Cited

FOREIGN PATENT DOCUMENTS

| JP | 2001-522057 A | 11/2001 |
|----|---------------|---------|
| JP | 2004-072185   | 3/2004  |
| JP | 2004-080174 A | 3/2004  |
| JP | 2004-533730 A | 11/2004 |
| JP | 2005-127050   | 5/2005  |
| JP | 2006-050210 A | 2/2006  |
| JP | 2008-262363   | 10/2008 |
| WO | WO2002/013455 A1 | 2/2002 |
| WO | WO2002/035764 A2 | 5/2002 |
| WO | WO2008/099756 A1 | 8/2008 |
| WO | WO2015/019572 A1 | 2/2015 |

OTHER PUBLICATIONS

Nov. 7, 2017, Japanese Office Action Issued for related JP application No. 2015-530779.
May 29, 2018, Japanese Office Action issued for related JP application No. 2015-530779.

* cited by examiner

INFORMATION PROCESSING APPARATUS, INFORMATION PROCESSING METHOD, AND COMPUTER PROGRAM

CROSS REFERENCE TO PRIOR APPLICATION

This application is a National Stage Patent Application of PCT International Patent Application No. PCT/JP2014/069063 (filed on Jul. 17, 2014) under 35 U.S.C. § 371, which claims priority to Japanese Patent Application No. 2013-162282 (filed on Aug. 5, 2013), which are all hereby incorporated by reference in their entirety.

TECHNICAL FIELD

The present disclosure relates to an information processing apparatus, an information processing method, and a computer program.

BACKGROUND ART

Individual authentication methods can be classified into 3 kinds of authentications, i.e., authentication by knowledge, authentication by belongings, and authentication by biological information. The authentication by knowledge includes, for example, authentication by a password and the authentication by belongings includes, for example, authentication by a magnetic card with a magnetic stripe or an IC card with an IC chip. Also, the authentication by biological information includes authentication by a fingerprint, authentication by a vein, and authentication by an iris.

Also, in the authentication by belongings, there is a method in which a key apparatus including key information performs communication with another external apparatus for authentication. For example, Patent Literature 1 discloses a smart entry system in which a call signal is transmitted from a vehicle side to a key apparatus, and the vehicle side collates a response signal and unlocks a door when the key apparatus replies to the call signal with the response signal including unique ID information.

CITATION LIST

Patent Literature

Patent Literature 1 JP 2005-127050A

SUMMARY OF INVENTION

Technical Problem in recent years, apparatuses including wireless communication systems in which radio waves arrive up to distant destinations of tens of meters have continued to increase. When such apparatuses are used, it is necessary to guarantee security of authentication by key apparatuses.

Accordingly, the present disclosure provides a novel and improved information processing apparatus, a novel and improved information processing method, and a novel and improved computer program capable of guaranteeing security without dependency on a distance of wireless communication while maintaining convenience of a key apparatus.

Solution to Problem

According to the present disclosure, there is provided an information processing apparatus including: a key storage unit configured to retain one or more secret keys corresponding to one or more respective public keys; and a key use permission state storage unit configured to store presence or absence of use permission of each of the one or more secret keys. For at least any of the one or more secret keys, a switch between the presence and absence of the use permission stored by the key use permission state storage unit is possible.

According to the present disclosure, there is provided an information processing apparatus including: a key storage unit configured to store one or more public keys corresponding to one or more respective secret keys retained by an apparatus that issues an authentication request; and a verification unit configured to supply first information to the apparatus, acquire, from the apparatus, second information generated using the secret key in regard to the first information, and verify the authentication request from the apparatus using the public key and the second information.

According to the present disclosure, there is provided an information processing method including: a step of retaining one or more secret keys corresponding to one or more respective public keys; and a step of storing presence or absence of use permission of each of the one or more secret keys. For at least any of the one or more secret keys, a switch between the presence and absence of the use permission stored in the step of storing presence or absence of use permission is possible.

According to the present disclosure, there is provided an information processing method including: a step of storing one or more public keys corresponding to one or more respective secret keys retained by an apparatus that issues an authentication request; and a step of supplying first information to the apparatus, acquiring, from the apparatus, second information generated using the secret key in regard to the first information, and verifying the authentication request from the apparatus using the public key and the second information.

According to the present disclosure, there is provided a computer program causing a computer to perform: a step of retaining one or more secret keys corresponding to one or more respective public keys; and a step of storing presence or absence of use permission of each of the one or more secret keys. For at least any of the one or more secret keys, a switch between the presence and absence of the use permission stored in the step of storing presence or absence of use permission is possible.

According to the present disclosure, there is provided a computer program causing a computer to perform: a step of storing one or more public keys corresponding to one or more respective secret keys retained by an apparatus that issues an authentication request; and a step of supplying first information to the apparatus, acquiring, from the apparatus, second information generated using the secret key in regard to the first information, and verifying the authentication request from the apparatus using the public key and the second information.

Advantageous Effects of Invention

According to an embodiment of the present disclosure described above, it is possible to provide a novel and improved information processing apparatus, a novel and improved information processing method, and a novel and improved computer program capable of guaranteeing security without dependency on a distance of wireless communication while maintaining convenience of a key apparatus.

DESCRIPTION OF EMBODIMENTS

Figure 1:
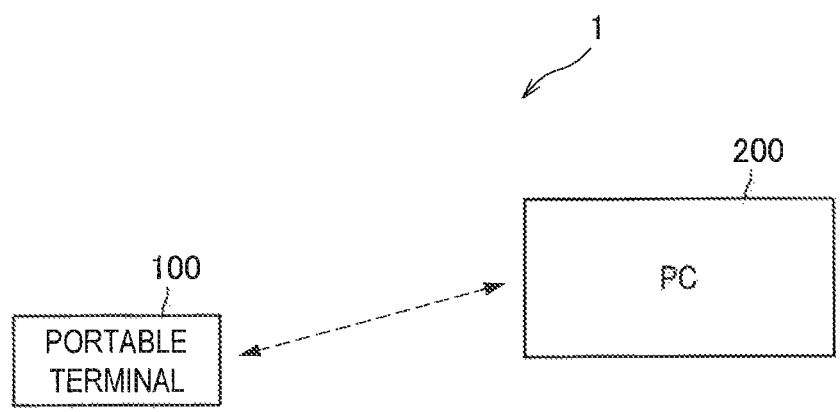
FIG. 1 is an explanatory diagram illustrating an example of an overall configuration of an information processing system 1 according to an embodiment of the present disclosure.

Hereinafter, preferred embodiments of the present disclosure will be described in detail with reference to the appended drawings. In this specification and the drawings, elements that have substantially the same function and structure are denoted with the same reference signs, and repeated explanation is omitted.

The description will be made in the following order.
<1. Background of the present disclosure>
<2. Embodiment of the present disclosure>
[Example of system configuration]
[Example of functional configuration]
[Description of public key authentication scheme and secret key]
[Example of operation]
<3. Example of hardware configuration>
<4. Conclusion>

1. BACKGROUND OF THE PRESENT DISCLOSURE

First, the background of the present disclosure will be mentioned before an embodiment of the present disclosure is described in detail. After the background of the present disclosure is mentioned, the embodiment of the present disclosure in relation to the background will be described in detail.

The technology disclosed in Patent Literature 1 is a technology that functions securely when a key apparatus and a vehicle are connected through wireless communication at a close distance (for example, about 1 meter). For example, connection between the key apparatus and the vehicle through wireless communication at a distance equal to or greater than tens of meters is not assumed. When the smart entry system disclosed in Patent Literature 1 is applied to wireless communication of a distance equal to or greater than tens of meters, the key apparatus may respond to a call signal from a distant vehicle. Therefore, there is a risk of a door of the vehicle being unlocked and a third party stealing the vehicle.

In recent years, apparatuses including wireless communication systems in which radio waves arrive up to distant destinations of tens of meters have continued to increase. When the authentication system using a key apparatus disclosed in Patent Literature 1 is applied to securely manipulate such apparatuses, it is necessary to handle the following events.

For example, when a key apparatus is out of the visual field of a user, there is assumed a case in which the key apparatus may arbitrarily respond to a call signal from an apparatus even when the owner of the key apparatus has no such intention. There is also assumed a case in which, when wireless communication between the apparatus and the key apparatus is not necessarily encrypted and a response signal including unique ID information is transmitted through the unencrypted wireless communication, the unique ID signal may be leaked by wiretapping. There are a plurality of encryption technologies for wireless communication. However, since a user sets whether to encrypt communication, communication content may not be said to be sufficiently protected.

When a personal computer or a web service on the Internet is locked and authentication of the personal computer or the web service is attempted using a key apparatus unlike a key of an automobile or a house, it is desirable to store one or more keys in one key apparatus and switch the keys for use from the viewpoint of usability.

Accordingly, according to an embodiment of the present disclosure to be described below, a technology for guaranteeing security without dependence on a distance of wireless communication while maintaining convenience of a key apparatus when one or more keys are stored in the one key apparatus will be described.

2. EMBODIMENT OF THE PRESENT DISCLOSURE

[Example of System Configuration]

First, an example of the configuration of an information processing system according to an embodiment of the present disclosure will be described with reference to the drawings. FIG. 1 is an explanatory diagram illustrating an example of the overall configuration of an information processing system 1 according to the embodiment of the present disclosure. Hereinafter, the example of the overall configuration of the information processing system 1 according to the embodiment of the present disclosure will be described with reference to FIG. 1.

As illustrated in FIG. 1, the information processing system 1 according to the embodiment of the present disclosure is configured to include a portable terminal 100 and a personal computer (PC) 200.

The information processing system 1 according to the embodiment of the present disclosure is a system that authenticates a user who attempts to use a service provided by the PC 200 according to a public key authentication scheme or a digital signature scheme when the user attempts to use the service. The portable terminal 100 is an apparatus that generates a pair of keys, i.e., a public key pk and a secret key sk. When the portable terminal 100 uses a service provided by the PC 200, the portable terminal 100 transmits only the public key pk between the generated pair of keys to the PC 200.

The portable terminal 100 can generate not only one pair of keys but also a plurality of pairs of keys. The portable terminal 100 can set respective different public keys pk in regard to a plurality of services for which authentication is gained by generating a plurality of pairs of keys.

The PC 200 is an apparatus that performs authentication according to a public key authentication scheme or a digital signature scheme. The PC 200 retains the public key pk generated by the portable terminal 100 and registered from the portable terminal 100 beforehand. Then, the PC 200 authenticates a user attempting to use a service using information generated based on the public key pk registered from the portable terminal 100 and the secret key sk corresponding to the public key pk generated by the portable terminal 100.

The service provided by the PC 200 may include, for example, login or unlocking of the PC 200, execution of an application installed in the PC 200, reproduction of contents (for example, music data, still image data, video data, or electronic book data) on the PC 200, or the like. A process of reproduction contents on the PC 200 can include, for example, a music or video reproduction process, an image display process, and an electronic book reproduction process. The user of the PC 200 can lock the login or unlocking of the PC 200, the execution of an application installed in the PC 200, the reproduction of the contents on the PC 200, or the like, as described above, with a key by generating a pair of keys, i.e., the public key pk and the secret key sk, with the portable terminal 100 and registering the public key pk in the PC 200. Then, when a service locked with the key is attempted to be performed, the PC 200 transmits an authentication request to the portable terminal 100 having the secret key sk corresponding to the public key set for the service and determines whether there is authority to perform the service based on a reply from the portable terminal 100.

The portable terminal 100 may be, for example, a device such as a smartphone, a table type terminal, a portable telephone, or a PHS or may be a wristwatch type device, a wristband type device, a finger ring type device, a glasses type device, any type of wearable device, or a key holder type device. Any type of device may be used as the portable terminal 100 as long as the device is able to generate and retain a pair of keys, i.e., the public key pk and the secret key sk, and communicate with the PC 200. The PC 200 may be, for example, a television, a smartphone, a tablet type terminal, a glasses type wearable device, a camera, a camcorder, a hard disk recorder, or a game device. Any type of device may be used as the PC 200 as long as the device can retain the public key pk and communicate with the portable terminal 100.

The communication between the portable terminal 100 and the PC 200 may be wired communication or may be wireless communication. In the following description, the communication between the portable terminal 100 and the PC 200 is assumed to be wireless communication unless otherwise specified. Also, in the wireless communication between the portable terminal 100 and the PC 200, for example, a wireless LAN, Bluetooth (registered trademark), ZigBee (registered trademark), or the like may be used.

The example of the overall configuration of the information processing system 1 according to the embodiment of the present disclosure has been described above with reference to FIG. 1. Next, an example of a functional configuration of the portable terminal 100 according to the embodiment of the present disclosure will be described.

[Example of Functional Configuration]

Figure 2:
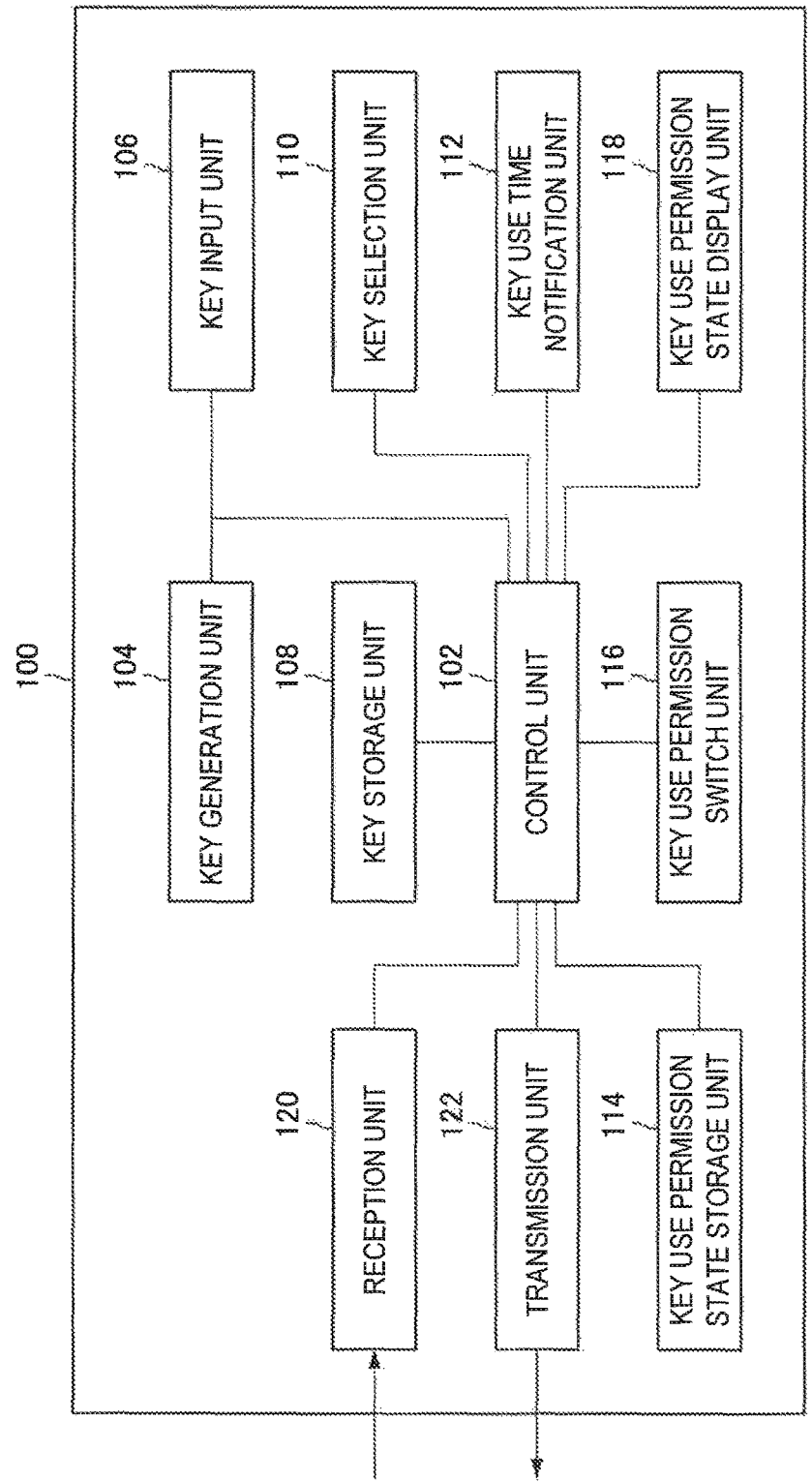
FIG. 2 is an explanatory diagram illustrating an example of a functional configuration of a portable terminal 100 according to an embodiment of the present disclosure.

FIG. 2 is an explanatory diagram illustrating an example of the functional configuration of the portable terminal 100 according to the embodiment of the present disclosure. Hereinafter, the example of the functional configuration of the portable terminal 100 according to the embodiment of the present disclosure will be described with reference to FIG. 2.

As illustrated in FIG. 2, the portable terminal 100 according to the embodiment of the present disclosure is configured to include a control unit 102, a key generation unit 104, a key input unit 106, a key storage unit 108, a key selection unit 110, a key use time notification unit 112, a key use permission state storage unit 114, a key use permission switch unit 116, a key use permission state display unit 118, a reception unit 120, and as transmission unit 122.

The control unit 102 controls an operation of the portable terminal 100. That is, each of the constituent elements of the portable terminal 100 illustrated in FIG. 2 operates under the control of the control unit 102, Also, when an authentication request is transmitted from the PC 200, the control unit 102 performs a process of generating a reply to the authentication request using one secret key sk among secret keys sk stored in the key storage unit 108 to be described below.

The key generation unit 104 generates a pair of keys, a public key pk and a secret key sk. In the embodiment, a public key authentication scheme is not limited to a specific scheme. For example, the public key authentication scheme may use RSA cryptography or may use elliptic curve cryptography. Also, as will be described below in detail, a public key authentication scheme using multi-order multivariate simultaneous equations that are difficult to solve as a basis for security may be used, as disclosed in, for example, JP 2012-98690A.

The key input unit 106 allows the user of the portable terminal 100 to input a pair of keys, i.e., a public key pk and a secret key sk. In the public key authentication scheme using multi-order multivariate simultaneous equations that are difficult to solve as a basis for security, as disclosed in, for example, JP 2012-98690A described above, the length of a key for ensuring 80-bit security is only 80 bits. Accordingly, when the public key authentication scheme using multi-order multivariate simultaneous equations that are difficult to solve as a basis for security is used, the key input unit 106 can set key information having considerably high security, for example, by allowing the user to input information with a length equal to or less than 140 bits.

The key storage unit 108 stores the pair of keys, i.e., the public key pk and the secret key sk, generated by the key generation unit 104 or input by the key input unit 106. Of the pair of keys, i.e., the public key pk and the secret key sk, stored in the key storage unit 108, the public key pk can be transmitted from the transmission unit 112 to the PC 200 in order to lock the service provided by the PC 200 with the key. Since the secret key sk is stored in the key storage unit 108, the key storage unit 108 preferably has a tamper-resistant property.

The key selection unit 110 allows the user to decide which secret key sk enters a selection state among the secret keys sk stored in the key storage unit 108. When the key selection unit 110 causes one secret key sk to enter the selection state among the secret keys sk stored in the key storage unit 108, the portable terminal 100 can generate a reply to the authentication request from the PC 200 using the secret key sk having entered the selection state.

When the control unit 102 generates the reply to the authentication request from the PC 200 using one secret key sk among the secret keys sk stored in the key storage unit 108, the key use time notification unit 112 performs notification of the use of the secret key sk by an image, audio, vibration, or the like.

The key use permission state storage unit 114 stores a use permission or non-permission state regarding each of the secret keys sk stored in the key storage unit 108. Also, the key use permission switch unit 116 switches the use permission or non-permission state stored by the key use permission state storage unit 114 and related to each of the secret keys sk stored in the key storage unit 108 based on a manipulation of the user of the portable terminal 100. Then, the key use permission state display unit 118 displays a use permission or non-permission state stored in the key use permission state storage unit 114 in regard to each of the secret keys sk stored in the key storage unit 108 based on a user manipulation of the portable terminal 100.

The key use permission switch unit 116 may switch the use permission or non-permission states of some or all of the secret keys sk stored in the key storage unit 108 en bloc. In this case, when use permission situations of all of the secret keys sk are different from a use permission situation of the individual secret keys sk, the key use permission switch unit 116 may prioritize use permission or non-permission of all of the secret keys sk or may prioritize use permission or non-permission of the individual secret keys sk.

The reception unit 120 receives information wirelessly transmitted from the PC 200, The information received from the PC 200 by the reception unit 120 includes, for example, a registration request of the public key pk in the PC 200 or an authentication request using the public key pk.

The transmission unit 122 wirelessly transmits information to the PC 200. The information transmitted to the PC 200 by the transmission unit 122 includes, for example, the public key pk in response to the registration request of the public key pk in the PC 200 or a reply generated by the control unit 102 in response to the authentication request using the public key pk.

Since the portable terminal 100 according to the embodiment of the present disclosure has the configuration illustrated in FIG. 2, the plurality of secret keys sk can be retained in the key storage unit 108. Also, since the portable terminal 100 according to the embodiment of the present disclosure has the configuration illustrated in FIG. 2, one secret key sk among the plurality of secret keys sk retained in the key storage unit 108 can be set to enter the selection state. Also, since the portable terminal 100 according to the embodiment of the present disclosure has the configuration illustrated in FIG. 2, the use permission or non-permission can be set in each of the plurality of the secret keys sk retained in the key storage unit 108 and the use permission or non-permission state thereof can be indicated.

The example of the functional configuration of the portable terminal 100 according to the embodiment of the present disclosure has been described above with reference to FIG. 2. Next, an example of a functional configuration of the PC 200 according to the embodiment of the present disclosure will be described.

Figure 3:
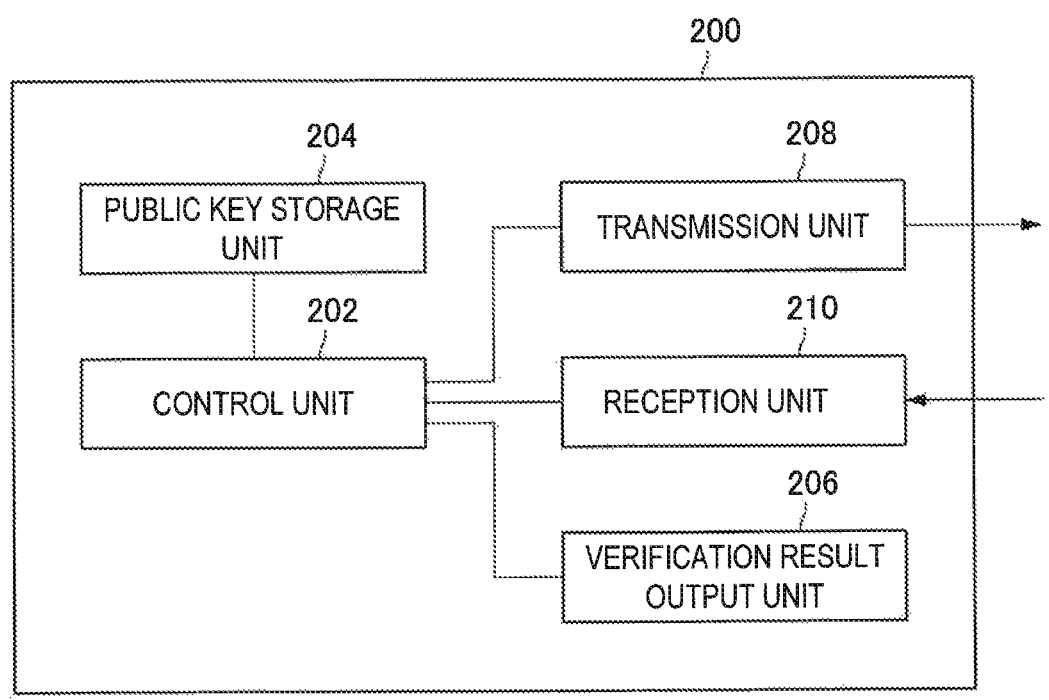
FIG. 3 is an explanatory diagram illustrating an example of a functional configuration of a PC 200 according to an embodiment of the present disclosure.

FIG. 3 is an explanatory diagram illustrating an example of a functional configuration of the PC 200 according to the embodiment of the present disclosure. Hereinafter, an example of the functional configuration of the PC 200 according to the embodiment of the present disclosure will be described with reference to FIG. 3.

As illustrated in FIG. 3, the PC 200 according to the embodiment of the present disclosure is configured to include a control unit 202, a public key storage unit 204, a verification result output unit 206, a transmission unit 208, and a reception unit 210.

The control unit 202 controls an operation of the PC 200. That is, each of the constituent elements of the PC 200 illustrated in FIG. 3 operates under the control of the control unit 202. Also, when an authentication request is transmitted from the PC 200 and a reply to the authentication request is transmitted from the portable terminal 100, the control unit 202 authenticates the portable terminal 100 transmitting the reply by verifying the reply.

The public key storage unit 204 stores the public key pk between the pair of keys, i.e., the public key pk and the secret key sk generated by the portable terminal 100. The public key pk generated by the portable terminal 100 is received by the reception unit 210 and is stored in the public key storage unit 204 by the control unit 202.

When the authentication request is transmitted from the PC 200 and a reply to the authentication request is transmitted from the portable terminal 100, the verification result output unit 206 outputs a verification result of the reply by an image, audio, vibration, or the like.

The transmission unit 208 wirelessly transmits information to the portable terminal 100. The information transmitted to the portable terminal 100 by the transmission unit 208 includes, for example, a registration request of the public key pk to the portable terminal 100 or the authentication request using the public key pk retained in the public key storage unit 204.

The reception unit 210 receives the information wirelessly transmitted from the portable terminal 100, The information received from the portable terminal 100 by the reception unit 210 includes, for example, the public key pk transmitted in response to the registration request of the public key pk in the PC 200 or a reply transmitted in response to the authentication request using the public key pk.

The example of the functional configuration of the PC 200 according to the embodiment of the present disclosure has been described above with reference to FIG. 3.

[Description of Public Key Authentication Scheme and Secret Key]

Next, the public key authentication scheme and the secret key will be described. The public key authentication scheme is an authentication scheme in which a certain person (prover) convinces another person (verifier) of her or his identity using the public key pk and the secret key sk. For example, a public key $pk_A$ of a prover A is published to a verifier. On the other hand, a secret key $sk_A$ of the prover A is managed secretly by the prover. According to the public key authentication scheme, a person who knows the secret key $sk_A$ corresponding to the public key $pk_A$ is regarded as the prover A herself or himself.

When the prover A proves her or his identity to a verifier B, the prover A may perform an interactive protocol with the verifier B and prove that she or he knows the secret key $sk_A$ corresponding to the public key $pk_A$. Furthermore, when the fact that the prover A knows the secret key skA is proved to the verifier B according to the interactive protocol, validity (identity) of the prover A is proved.

Also, the following two conditions are necessary in order to ensure security of the public key authentication scheme.

The first condition is a condition that probability of falsification being established by a falsifier having no secret key sk be as small as possible when an interactive protocol is performed. The fact that the first condition is established is called "soundness." That is, in an interactive protocol having soundness, it can be otherwise said that there is no case in which falsification is established at a non-negligible probability by a falsifier having no secret key sk. The second condition is a condition that information regarding the secret key $sk_A$ possessed by the prover A not leak to the verifier B even when an interactive protocol is performed. The fact that the second condition is established is called a "zero-knowledge properly."

By using an interactive protocol having the soundness and the zero-knowledge property described above, the security of the public key authentication scheme is ensured.

Figure 16:
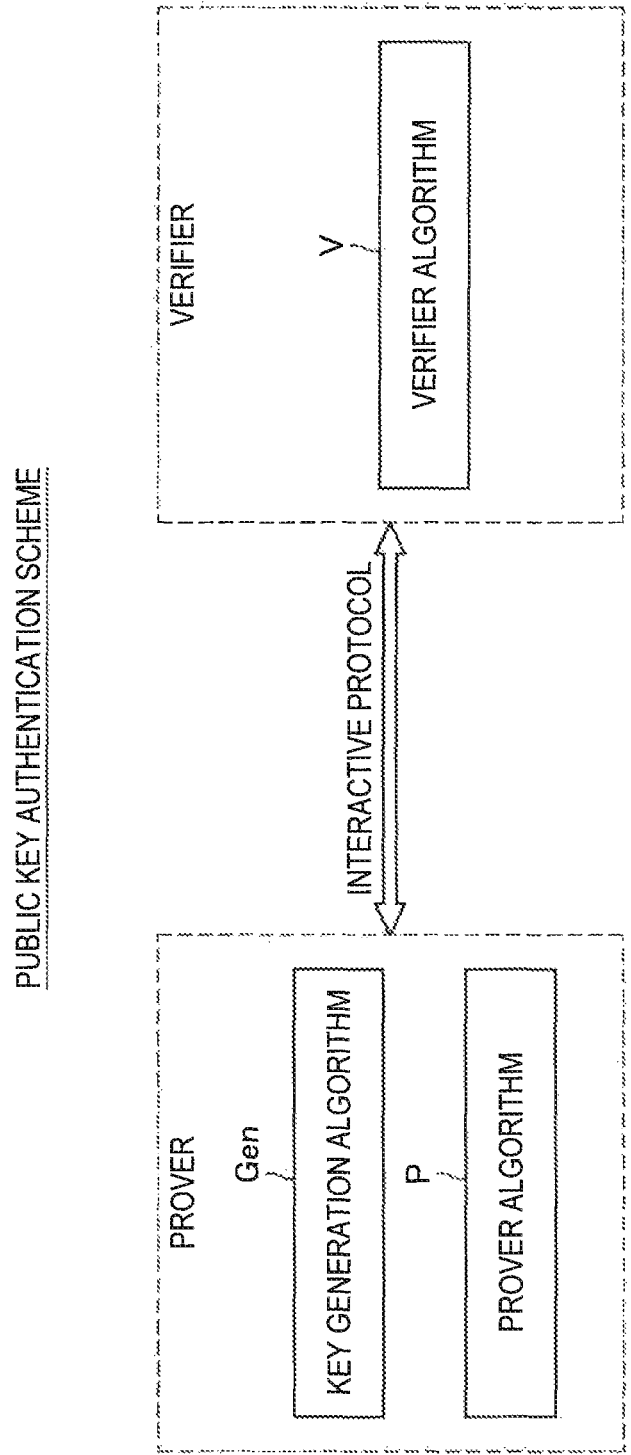
FIG. 16 is an explanatory diagram illustrating a public key authentication scheme.

In a model of the public key authentication scheme, two entities, namely a prover and a verifier, are present, as shown in FIG. 16. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public key authentication scheme is configured from two entities, namely the prover and the verifier, and three algorithms, namely the key generation algorithm Gen, the prover algorithm P and the verifier algorithm V.

Additionally, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus.

(Key Generation Algorithm Gen)

The key generation algorithm Gen is used by a prover. The key generation algorithm Gen is an algorithm for generating a pair of public key pk and secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk is used to prove to the verifier of possession of the secret key sk corresponding to the public key pk by the prover. Formally, the key generation algorithm Gen is represented as formula (1) below as an algorithm that takes security parameter $1^{lambda}$ (lambda is an integer of 0 or more) as an input and outputs the secret key sk and the public key pk.

[Math 1]

$$(sk, pk) \leftarrow \text{Gen}(1^{\lambda}) \qquad (1)$$

(Prover Algorithm P)

The prover algorithm P is used by the prover. Furthermore, the prover algorithm P is an algorithm for proving that the prover possesses the secret key sk corresponding to the public key pk. The prover algorithm P is defined as an algorithm that takes the secret key sk and the public key pk of the prover as inputs and performs an interactive protocol with the verifier.

(Verifier Algorithm V)

The verifier algorithm V is used by a verifier. Furthermore, the verifier algorithm V is an algorithm for verifying whether or not the prover possesses the secret key sk corresponding to the public key pk in an interactive protocol. The verifier algorithm V is defined as an algorithm that takes the public key pk of the prover as an input, and performs the interactive protocol with the prover, and subsequently outputs 0 or 1 (1 bit). Furthermore, the prover is assumed to be invalid when the output is 0 and the prover is assumed to be valid when the output is 1. Formally, the verifier algorithm V is represented as formula (2) below.

[Math 2]

$$0/1 \leftarrow V(pk) \qquad (2)$$

As described above, in the public key authentication scheme, it is necessary to satisfy the two conditions, i.e., the soundness and the zero-knowledge property, in order to ensure security. However, in order to prove to the verifier that the prover possesses the secret key sk, it is necessary for the prover to perform a procedure dependent on the secret key sk, notify the prover of the result, and cause the verifier to perform verification based on the notification content. It is necessary to perform the procedure dependent on the secret key sk in order to guarantee the soundness. Meanwhile, even when the verifier is notified of the result of the procedure, it is necessary not to leak information regarding the secret key sk to the verifier at all. Therefore, it is necessary to design the key generation algorithm Gen, the prover algorithm P, and the verifier algorithm V described above so that such requisites are satisfied.

Figure 17:
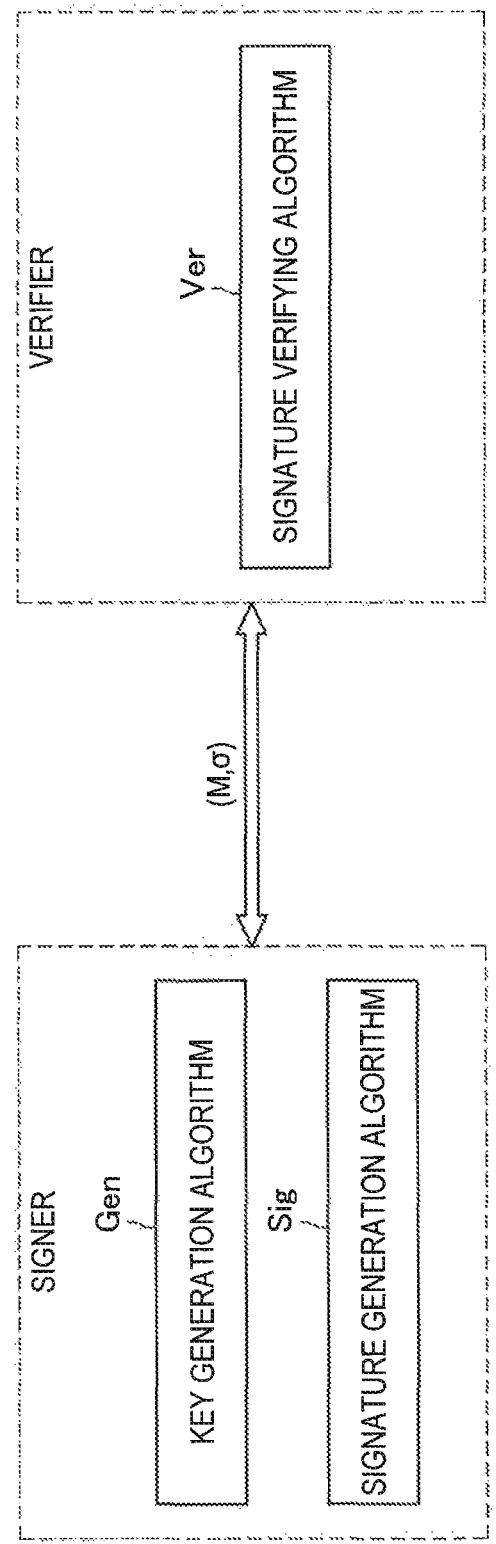
FIG. 17 is an explanatory diagram illustrating a digital signature scheme.

Next, algorithms for a digital signature scheme will be summarized. FIG. 17 is an explanatory diagram summarizing algorithms for a digital signature scheme.

Unlike paper documents, it is not possible to physically sign or affix a seal to digitized data. For this reason, proving the creator of digitized data involves an electronic setup yielding effects similarly to physically signing or affixing a seal to a paper document. This setup is digital signatures. A digital signature refers to a setup that associates given data with signature data known only to the creator of the data, provides the signature data to a recipient, and verifies that signature data on the recipient's end.

(Model)

As illustrated in FIG. 17, the two identities of signer and verifier exist in a model of a digital signature scheme. In addition, the model of a digital signature scheme is made up of three algorithms: a key generation algorithm Gen, a signature generation algorithm Sig, and a signature verifying algorithm Ver.

The signer uses the key generation algorithm Gen to generate a paired signature key sk and verification key pk unique to the signer. The signer also uses the signature generation algorithm Sig to generate a digital signature sigma to attach to a message M. In other words, the signer is an entity that attaches a digital signature sigma to a message M. Meanwhile, the verifier uses the signature verifying algorithm Ver to verify the digital signature attached to the message M. In other words, the verifier is an entity that verifies the digital signature sigma in order to confirm whether or not the creator of the message M is the signer.

Note that although the terms "signer" and "verifier" are used in the description hereinafter, these terms ultimately mean entities. Consequently, the agent that executes the key generation algorithm Gen and the signature generation algorithm Sig is an information processing apparatus corresponding to the "signer" entity. Similarly, the agent that executes the signature verifying algorithm Ver is an information processing apparatus.

(Key Generation Algorithm Gen)

The key generation algorithm Gen is used by the signer. The key generation algorithm Gen is an algorithm that generates a paired signature key sk and verification key pk unique to the signer. The verification key pk generated by the key generation algorithm Gen is made public. Meanwhile, the signer keeps the signature key sk generated by the key generation algorithm Gen a secret. The signature key sk is then used to generate digital signature sigma to attach to a message M. For example, the key generation algorithm Gen accepts a security parameter $1^p$ (where p is an integer equal to or greater than 0) as input, and outputs a signature key sk and a verification key pk. In this case, the key generation algorithm Gen may be expressed formally as in the following formula (3).

[Math 3]

$$(sk, pk) \leftarrow Gen(1^\lambda) \qquad (3)$$

(Signature Generation Algorithm Sig)

The signature generation algorithm Sig is used by the signer. The signature generation algorithm Sig is an algorithm that generates a digital signature sigma to be attached to a message M. The signature generation algorithm Sig is an algorithm that accepts a signature key sk and a message M as input, and outputs a digital signature sigma. The signature generation algorithm Sig may be expressed formally as in the following formula (4).

[Math 4]

$$\sigma \leftarrow Sig(sk, M) \qquad (4)$$

(Signature Verifying Algorithm Ver)

The signature verifying algorithm Ver is used by the verifier. The signature verifying algorithm Vet is an algorithm that verifies whether or not the digital signature sigma is a valid digital signature for the message NI. The signature verifying algorithm Ver is an algorithm that accepts a signer's verification key pk, a message M, and a digital signature sigma as input, and outputs 0 or 1 (1 bit). The signature verifying algorithm Ver may be expressed formally as in the following formula (5). At this point, the verifier decides that the digital signature sigma is invalid in the case where the signature verifying algorithm Ver outputs 0 (the case where the verification key pk rejects the message M and the digital signature sigma), and decides that the digital signature sigma is valid in the case where the signature verifying algorithm Ver outputs 1 (the case where the verification key pk accepts the message M and the digital signature sigma).

[Math 5]

$$0/1 \leftarrow Ver(pk, M, \sigma) \qquad (5)$$

In the present disclosure, neither the public key authentication scheme nor the digital signature scheme is limited to a specific scheme. For example, the public key authentication scheme or the digital signature scheme may use RSA cryptography or may use elliptic curve cryptography. Also, the public key authentication scheme or the digital signature scheme using multi-order multivariate simultaneous equations that are difficult to solve as a basis for security may be used, as disclosed in, for example, JP 2012-98690A, The function used in the foregoing document is a function formed by m n-variable quadratic polynomials (where both of m and n are integers of 2 or more).

For example, in order to ensure 80-bit security, a key length of 1024 bits is necessary in the case of the RSA cryptography and a key length of 160 bits is necessary even in the case of ECDSA. Meanwhile, in the above-described case of the public key authentication scheme using multi-order multivariate simultaneous equations that are difficult to solve as a basis for security, the length of a key for ensuring 80-bit security is only 80 bits. Accordingly, when a user attempts to register a public key or receive authentication using a secret key in a service such as a web service, it is more preferable to use the above-described public key authentication scheme using multi-order multi variate simultaneous equations that are difficult to solve as a basis for security and in which the number of characters input by the user is small.

When the public key authentication scheme or the digital signature scheme using multi-order multivariate simultaneous equations that are difficult to solve as a basis for security, as disclosed in, for example, JP 2012-98690A, is used, the size of a public key is decreased. Therefore, it is possible to expect the advantageous effect of reducing trouble in terms of administration or management and an improvement in a long-term security level. For example, in terms of the administration, it is possible to expect the advantageous effects of decreasing the restriction on display of the public key and shortening a length which can be input and transmitted. Also, in terms of the management, since the size of a public key is small, it is possible to expect the advantageous effects of reducing the size of a database and setting a key only through a copy manipulation of a text string. Furthermore, in terms of security, it is possible to expect long-term security because of a scheme dependent on mathematically difficult problems.

[Example of Operation]

Figure 4:
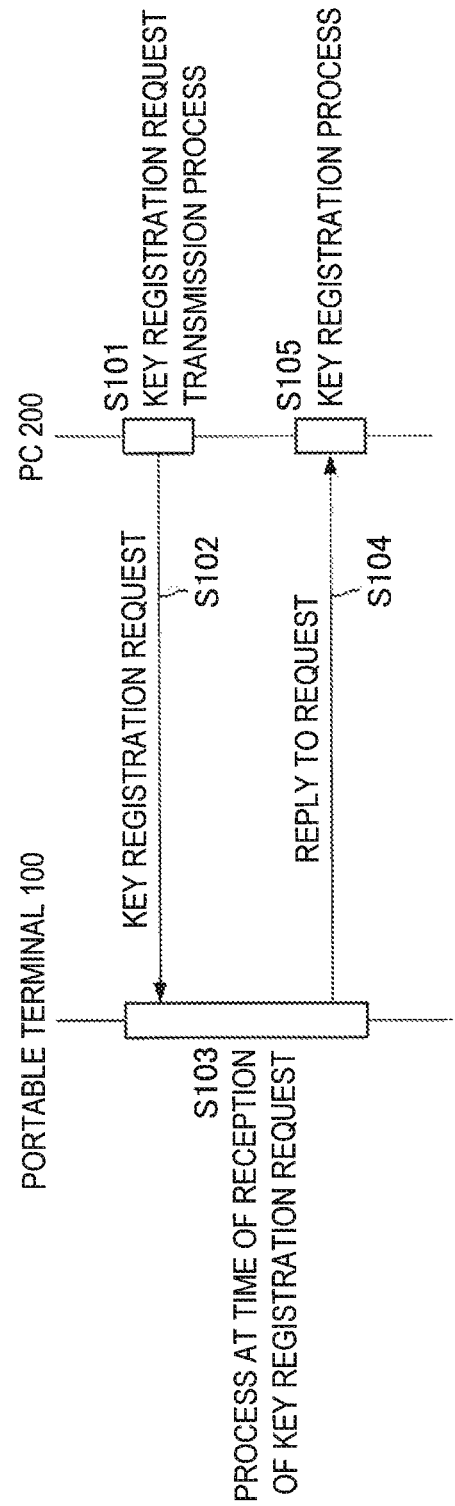
FIG. 4 is a flowchart illustrating an example of an operation of an information processing system 1 according to an embodiment of the present disclosure.

Next, an example of an operation of the information processing system 1 according to the embodiment of the present disclosure will be described. FIG. 4 is a flowchart illustrating the example of the operation of the information processing system 1 according to the embodiment of the present disclosure. The flowchart illustrated in FIG. 4 shows an operation of transmitting a key registration request from the PC 200 to the portable terminal 100, generating keys by the portable terminal 100, and transmitting a public key pk from the portable terminal 100 to the PC 200. Hereinafter, an example of an operation of the information processing system 1 according to the embodiment of the present disclosure will be described with reference to FIG. 4.

When the PC 200 requests key registration from the portable terminal 100, the control unit 202 first performs a key registration request transmission process (step S101). The key registration request transmission process can be performed in various settings. For example, when the user of the PC 200 attempts to register the public key pk in the PC 200, the user manipulates the PC 200 to perform the key registration request transmission process.

When the key registration request transmission process is performed in the foregoing step S101, the PC 200 subsequently transmits the key registration request wirelessly from the transmission unit 208 to the portable terminal 100 (step S102). When the reception unit 120 of the portable terminal 100 receives the key registration request wirelessly transmitted from the transmission unit 208 in step S102, the portable terminal 100 performs a process at the time of the reception of the key registration request along with the reception of the key registration request (step S103).

The process at the time of the reception of the key registration request in step S103 can include a process of generating a pair of keys, i.e., the public key pk and the secret key sk, or a process of causing the user to input the public key pk and the secret key sk. The process of generating a pair of keys, i.e., the public key pk and the secret key sk, can be performed by, for example, the key generation unit 104 and the process of causing the user to input the public key pk and the secret key sk can be performed by the key input unit 106.

When the process at the time of the reception of the key registration request is performed in the foregoing step S103, the portable terminal 100 subsequently transmits a reply to the key registration request wirelessly from the transmission unit 122 to the PC 200 (step S104). The reply to the key registration request wirelessly transmitted from the transmission unit 122 in step S104 includes the public key pk generated in the foregoing step S103.

When the PC 200 receives the reply to the key registration request wirelessly transmitted from the portable terminal 100 in the foregoing step S104, the PC 200 registers the public key pk included in the reply (step S105). The registration of the public key pk in step S105 can be performed by the control unit 202. Also, the public key pk received by the PC 200 is stored in the public key storage unit 204.

The portable terminals 100 and the PC 200 operate, as illustrated in FIG. 4, such that the key registration request can be transmitted from the PC 200 to the portable terminal 100, the keys can be generated by the portable terminal 100, and the public key pk can be transmitted from the portable terminal 100 to the PC 200. Also, the PC 200 can operate, as illustrated in FIG. 4, to store the public key pk transmitted from the portable terminal 100.

The example of the operation of the information processing system according to the embodiment of the present disclosure has been described above with reference to FIG. 4. Next, an example of an authentication process using the public key pk stored in the PC 200 will be described.

Figure 5:
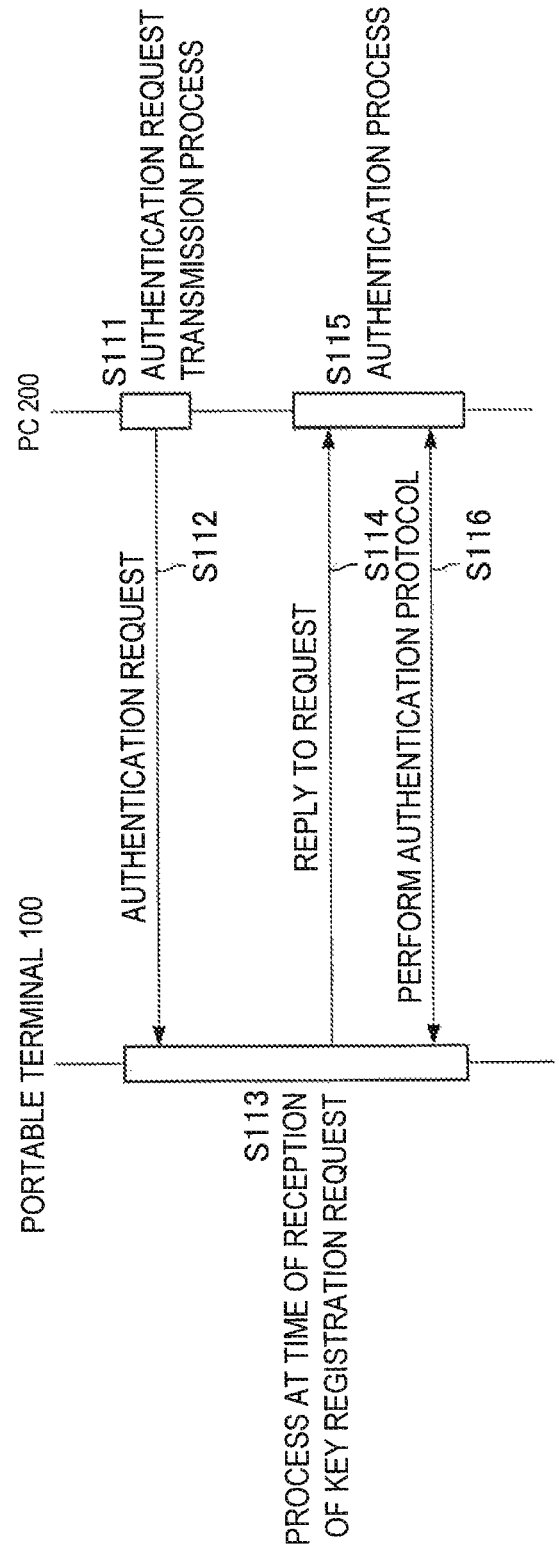
FIG. 5 is a flowchart illustrating an example of an operation of the information processing system 1 according to an embodiment of the present disclosure.

FIG. 5 is a flowchart illustrating an example of an operation of the information processing system 1 according to the embodiment of the present disclosure. The flowchart illustrated in FIG. 5 is an example of an authentication process using the public key pk stored in the PC 200. Hereinafter, the example of the operation of the information processing system 1 according to the embodiment of the present disclosure will be described with reference to FIG. 5.

When the PC 200 performs the authentication process using the public key pk, the control unit 202 first performs an authentication request transmission process (step S111). The authentication request transmission process can be performed in various settings. The authentication request transmission process can be performed, for example, when the user of the PC 200 attempts to log in to the PC 200, the user attempts to unlock the PC 200, the user executes an application installed in the PC 200, the user performs any process using an application installed in the PC 200, and the user attempts to reproduce content on the PC 200. The process using an application installed in the PC 200 can include, for example, a process of attempting to access a specific page using a web browser and a process of editing a document using document generation software. Also, the process of reproducing content on the PC 200 can include, for example, a music or moving image reproduction process, an image display process, and an electronic book reproduction process.

When the authentication request transmission process is performed in the foregoing step S111, the PC 200 subsequently transmits an authentication request wirelessly from the transmission unit 208 to the portable terminal 100 (step S112). When the reception unit 120 of the portable terminal 100 receives the authentication request wirelessly transmitted from the transmission unit 208 in step S102, the portable terminal 100 performs a process at the time of the reception of the authentication request along with the reception of the authentication request (step S113).

Here, information transmitted from the PC 200 to the portable terminal 100 in the foregoing step S112 can include, for example, a challenge generated in the PC 200 at the time of the authentication of it challenge response scheme using a public key authentication scheme. In addition, the process at the time of the reception of the authentication request in step S113 includes a process of generating a response to the challenge transmitted from the PC 200 by the control unit 102 using the secret key sk stored in the key storage unit 108.

When the PC 200 transmits the authentication request in the foregoing step S112, predetermined signature information may be added to the challenge and may be transmitted. For example, a date and a time at which the challenge is generated may be used as the predetermined signature information. When the PC 200 adds the predetermined signature information to the challenge and transmits the challenge, the portable terminal 100 can be caused to reply a response including the signature information. Then, the PC 200 can determine whether or not the challenge is the challenge generated by the PC 200 itself by confirming the signature information included in the response.

When the process at the time of the reception of the authentication request is performed in the foregoing step S113, the portable terminal 100 subsequently transmits the reply to the authentication request wirelessly from the transmission unit 122 to the PC 200 (step S114). The reply wirelessly transmitted from the transmission unit 122 in step S114 and made to the authentication request includes the response to the challenge generated in the foregoing step S113.

When the PC 200 receives the reply to the authentication request wirelessly transmitted from the portable terminal 100 in the foregoing step S104, the PC 200 performs the authentication process using the response included in the reply (step S115). The authentication process of step S115 can be performed by the control unit 202. In addition, the authentication process of step S115 is performed by determining whether or not the response included in the reply from the portable terminal 100 is a correct answer value.

When interactions greater than one round trip are necessary in the authentication process, the authentication process is performed in step S115 and the PC 200 subsequently performs a predetermined authentication protocol necessary between the PC 200 and the portable terminal 100 (step S116). The authentication protocol may be performed as necessary, and may not necessarily be performed, for example, when the authentication process is completed by one round trip in the authentication protocol.

The transmission of the challenge from the PC 200 to the portable terminal 100 or the transmission of the response to the challenge from the portable terminal 100 to the PC 200, as described above, may be performed a plurality of times. By transmitting the challenge and the response a plurality of times, it is possible to improve security of the authentication according to the public key authentication scheme.

The example of the operation of the information processing system 1 according to the embodiment of the present disclosure has been described above with reference to FIG. 5. Next, the process at the time of the reception of the authentication request in the portable terminal 100 in the foregoing step S113 will be described in more detail.

Figure 6:
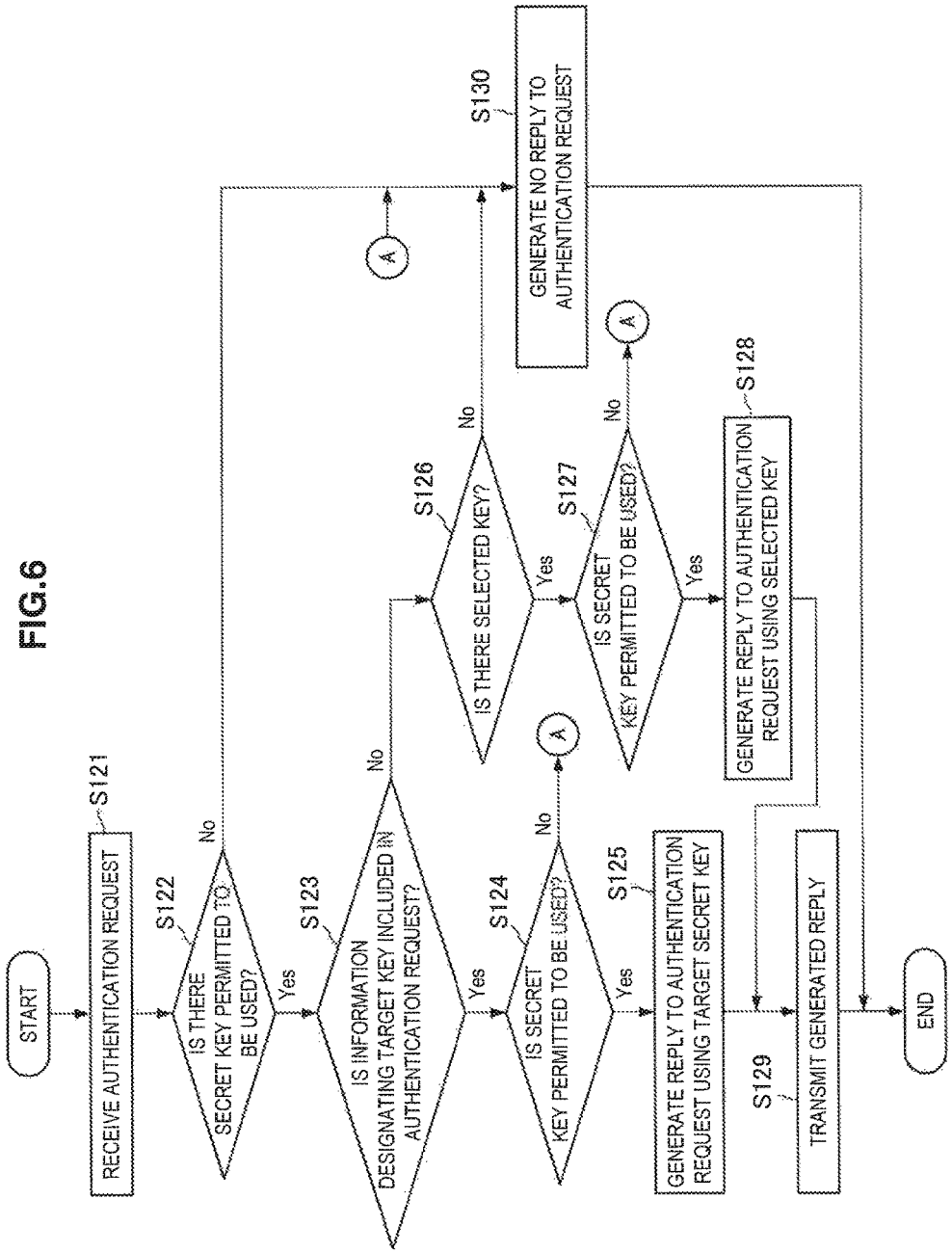
FIG. 6 is a flowchart illustrating an example of an operation of the portable terminal 100 according to an embodiment of the present disclosure.

FIG. 6 is a flowchart illustrating an example of an operation of the portable terminal 100 according to the embodiment of the present disclosure. The flowchart illustrated in FIG. 6 shows the details of the process at the time of the reception of the authentication request in the portable terminal 100 in step S113. Hereinafter, the example of the operation of the portable terminal 100 according to the embodiment of the present disclosure will be described with reference to FIG. 6.

When the reception unit 120 of the portable terminal 100 receives the authentication request wirelessly transmitted from the PC 200 (step S121), the control unit 102 determines whether there are one or more secret keys sk permitted to be used (step S122). Information regarding whether the secret keys sk are permitted to be used is stored in the key use permission state storage unit 114. Accordingly, the control unit 102 determines whether there are one or more secret keys sk permitted to be used with reference to the key use permission state storage unit 114.

When the determination result of the foregoing step S122 indicates that there are one or more secret keys sk permitted to be used, the portable terminal 100 causes the control unit 102 to continuously determine whether information designating a target secret key is included in the authentication request wirelessly transmitted from the PC 200 (step S123). That is, the control unit 102 determines whether the response to the challenge is designated to be generated with the secret key designated by the PC 200.

When the determination result of the foregoing step S123 indicates that the information designating the target secret key is included in the authentication request transmitted wirelessly from the PC 200, the portable terminal 100 causes the control unit 102 to continuously determine whether the designated secret key is permitted to be used (step S124).

When the determination result of the foregoing step S124 indicates that the designated key is permitted to be used, the portable terminal 100 causes the control unit 102 to continuously generate a reply to the authentication request using the designated secret key, that is, the response to the challenge (step S125).

Conversely, when the determination result of the foregoing step S123 indicates that the information designating the target secret key is not included in the authentication request transmitted wirelessly from the PC 200, the portable terminal 100 determines whether the secret key is currently selected (step S126). Whether the secret key is selected can be determined based on the conditions of, for example, whether information regarding the secret key is displayed on a screen and whether the secret key is stored in the key storage unit 108 in the state in which the secret key is selected.

Figure 7:
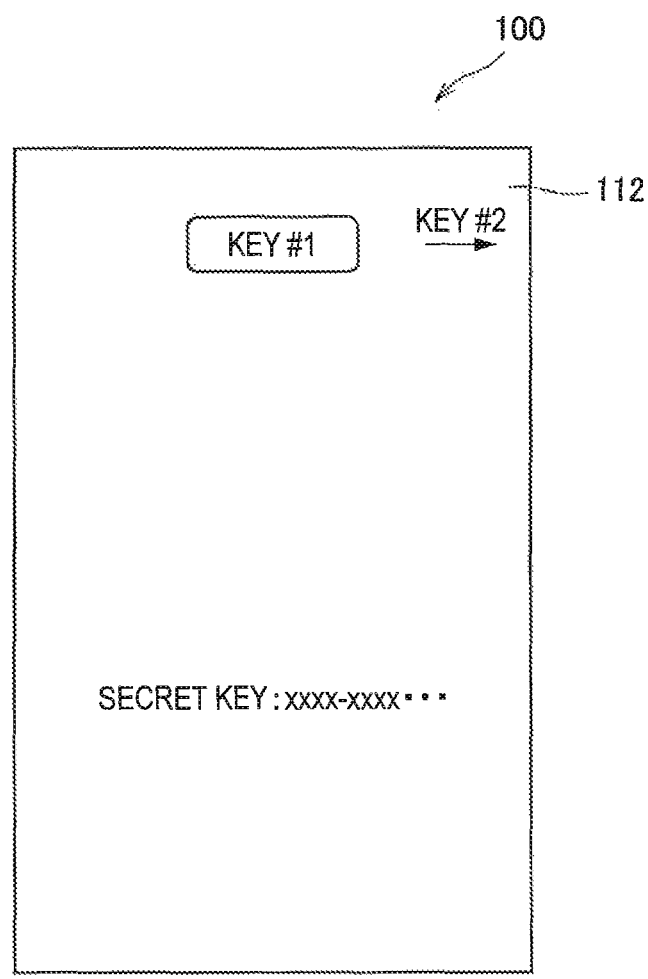
FIG. 7 is an explanatory diagram illustrating an example of a screen displayed in a portable terminal 100.

For example, a case in which the information regarding the secret key displayed on the screen is selected will be described. FIG. 7 is an explanatory diagram illustrating an example of a screen displayed in a portable terminal 100. In FIG. 7, one secret key selected among the secret keys stored in the portable terminal 100 is displayed on a screen (indicated by the key use time notification unit 112 in FIG. 7). That is, FIG. 7 illustrates a state in which the secret key sk named "key #1" is selected. When the user manipulates the portable terminal 100 and the screen is displayed, as illustrated in FIG. 7, the control unit 102 determines that the secret key sk named "key #1" is selected.

Of course, it is needless to say that a determination standard regarding which secret key is selected is not limited to the related example.

When the determination result of the foregoing step S126 indicates that the secret key is selected, the portable terminal 100 causes the control unit 102 to continuously determine whether the selected secret key is permitted to be used (step S127). When the determination result of step S127 indicates that the selected secret key is permitted to be used, the portable terminal 100 causes the control unit 102 to continuously generate the reply to the authentication request using the selected secret key, that is, the response to the challenge (step S128).

When the reply to the authentication request, that is, the response to the challenge, is generated in the foregoing step S125 or S128, the portable terminal 100 continuously wirelessly transmits the generated reply to the authentication request from the transmission unit 122 to the PC 200 (step S129).

When the control unit 102 determines in the foregoing step S122 that there is no secret key sk permitted to be used at all, the control unit 102 determines in the foregoing step S124 that the designated key is not permitted to be used, or the control unit 102 determines in the foregoing step S127 that the selected secret key is not permitted to be used, the control unit 102 generates no reply to the authentication request (step S130) and ends the series of processes.

When the control unit 102 determines in the foregoing step S122 that there is no secret key sk permitted to be used at all, the control unit 102 determines in the foregoing step S124 that the designated key is not permitted to be used, or the control unit 102 determines in the foregoing step S127 that the selected secret key is not permitted to be used, the control unit 102 may perform a process of requesting use permission of the secret key. As the process of requesting the use permission of the secret key, for example, there is a process of displaying a message on a screen so that the user can select whether to permit the use of the secret key.

When the control unit 102 generates the reply to the authentication, that is, the response to the challenge, in the foregoing step S125 or S128, the control unit 102 may cause the key use time notification unit 112 to notify the user that the secret key is used. Examples of the notification to the user by the key use time notification unit 112 can include lighting of a screen, display of a message on a screen, an output of audio, and vibration.

Figure 8:
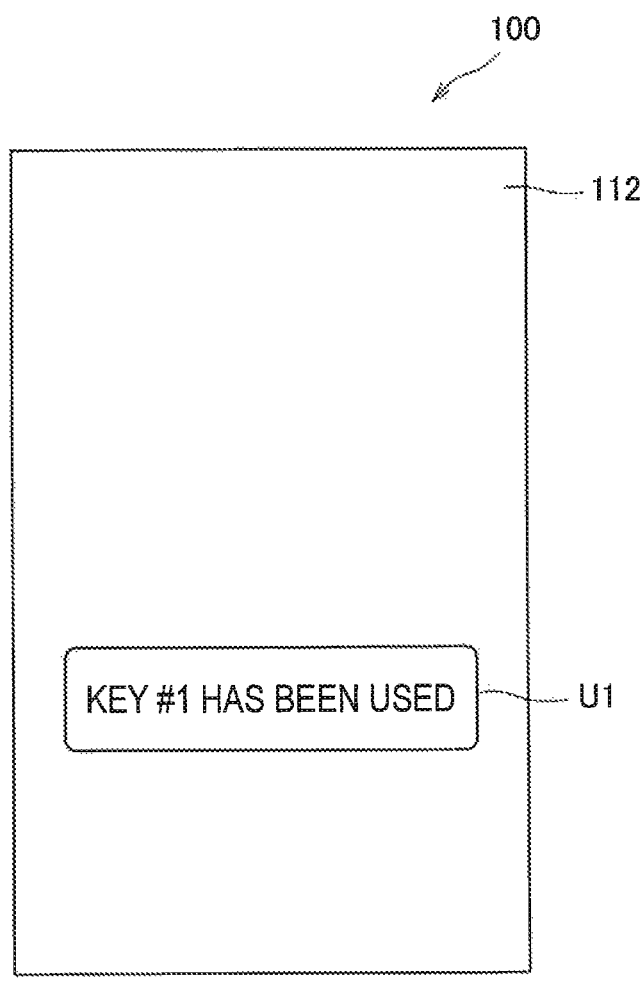
FIG. 8 is an explanatory diagram illustrating an example of a screen displayed in a portable terminal 100.

FIG. 8 is an explanatory diagram illustrating an example of a screen displayed in a portable terminal 100. FIG. 8 illustrates an example of a screen (indicated as the key use time notification unit 112 in FIG. 8) displayed in the portable terminal 100 when the user is notified with a message on the screen that the secret key has been used. In this way, by displaying the fact that the secret key has been used using a message U1 on the key use time notification unit 112, the portable terminal 100 can notify the user that the secret key has been used. Of course, the message illustrated in FIG. 8 is merely an example of a message displayed when the secret key is used. In the present disclosure, it is needless to say that the message displayed when the secret key is used is not limited to the related example.

The example of the operation of the portable terminal 100 according to an embodiment of the present disclosure when the authentication request is received from the PC 200 has been described with reference to FIG. 6.

When the portable terminal 100 according to an embodiment of the present disclosure has the configuration illustrated in FIG. 2 and receives an authentication request from the PC 200, presence or absence of the use permission of the key can be completely switched by performing the operation illustrated in FIG. 6 and the risk of the secret key being used at an unnecessary timing can be reduced by enabling the current state to be confirmed. The portable terminal 100 according to an embodiment of the present disclosure is configured to be able to switch presence or absence of the use permission for each secret key. Thus, it is possible to obtain the advantageous effect of preventing another key from being used unexpectedly when one key is used.

The portable terminal 100 according to an embodiment of the present disclosure has the configuration illustrated in FIG. 2, and thus it is possible to notify the user of the use of the secret key. The portable terminal 100 according to an embodiment of the present disclosure notifies the user of the use of the secret key, and thus it is possible to prevent an increase in damage when the secret key stored in the portable terminal 100 is used willfully. The portable terminal 100 according to an embodiment of the present disclosure notifies the user of the use of the secret key, and thus it is also possible to expect the advantageous effect of psychological suppression against an attacker planning to illegally use the secret key.

The portable terminal 100 according to an embodiment of the present disclosure uses public key authentication. The portable terminal 100 according to an embodiment of the present disclosure uses the public key authentication, and thus it is possible to obtain the following advantageous effects.

For example, even when the portable terminal 100 erroneously transmits the response to an apparatus other than the partner to which a reply is to be transmitted, the information regarding the secret key stored in the portable terminal 100 is not leaked. Therefore, there is no influence on security in the subsequent authentication. Even when the wireless communication between the portable terminal 100 and the PC 200 is not encrypted, the information regarding the secret key is not leaked at the time of wiretapping of communication content.

In order to verify validity of the portable terminal 100, information necessary for the PC 200 is only a public key. Accordingly, the public key can be shared with another apparatus different from the PC 200 or a service. As described above, there is also tolerance for communication wiretapping. Therefore, the public key can also be used to log in to a service on the Internet to be described below. At this time, it is also possible to log in to one service on the Internet from a plurality of apparatuses (for which apparatus registration is not performed).

The portable terminal 100 according to an embodiment of the present disclosure may confirm a user by authentication by knowledge, authentication by biological information, authentication by belongings, or a combination of the authentications when the use of the secret key is per witted by the key use permission switch unit 116. The portable terminal 100 according to an embodiment of the present disclosure can confirm a user by knowledge, biological information, belongings, or a combination thereof, and thus it is possible to further improve strength at the time of authentication.

In the authentication by knowledge, for example, there is authentication by a passcode. In the authentication by biological information, there are authentication by a fingerprint, authentication by veins, and authentication by an iris. In the authentication by belongings, there are authentication by a portable terminal or a card with an IC chip, and authentication by a Bluetooth device.

The portable terminal 100 according to an embodiment of the present disclosure may automatically cancel the use permission after the portable terminal 100 permits the use of the secret key and a given time passes. The portable terminal 100 according to an embodiment of the present disclosure may automatically cancel the use permission when the portable terminal 100 permits the use of the secret key and the secret key is not used for a given time.

When the portable terminal 100 permits the use of the secret key and an apparatus transmitting an authentication request is not a pre-registered apparatus, the portable terminal 100 according to an embodiment of the present disclosure may not reply to the authentication request. Registration information of an apparatus may be stored in, for example, the key storage unit 108. When an apparatus is not an apparatus registered in the key storage unit 108, the key use permission switch unit 116 may not reply to the authentication request and may cancel the use permission of the secret key which is a target of an authentication request.

This is because which apparatus is replied to is considered not to be known and thus security is not guaranteed when replies to requests from unregistered apparatuses are also permitted in an authentication case in which wireless communication of distances equal to or more than tens of meters is used. Here, as an example of apparatus registration, there is pairing of Bluetooth. Apart from the apparatus registration of a wireless apparatus, the portable terminal 100 may perform apparatus registration as an apparatus requesting use of a key, for example, by transmitting and receiving a public key from an apparatus of a partner side.

The portable terminal 100 may have a function of shortening a wireless arrival distance by lowering an output of a wireless apparatus through a manipulation by the user. By lowering the output of the wireless apparatus through the manipulation by the user and shortening the wireless arrival distance, the reply information is unlikely to arrive at the partner apparatus even when a reply is delivered unintentionally at the time of an authentication request from the outside of the visual field of the user of the portable terminal 100, and thus it is possible to reduce a risk of the unintentional reply to the authentication request.

The portable terminal 100 according to an embodiment of the present disclosure may display information regarding an apparatus transmitting an authentication request. When the portable terminal 100 receives an authentication request from an apparatus other than the registered apparatuses, the portable terminal 100 according to an embodiment of the present disclosure may perform different notification from normal notification, for example, different audio, different vibration, or a different color of light from the normal notification.

The portable terminal 100 according to an embodiment of the present disclosure may record, as a history, a time of delivery of an authentication request and information regarding a partner delivering an authentication request. The portable terminal 100 according to an embodiment of the present disclosure can confirm whether a suspicious request is delivered by recording histories of the times of delivery of authentication requests and information regarding partners delivering authentication requests. The histories may be stored in, for example, the key storage unit 108.

The example in which the portable terminal 100 and the PC 200 perform communication, the portable terminal 100 is authenticated from the PC 200, and use of a service provided by the PC 200 is permitted has been described above. Next, a case in which a secret key retained by the portable terminal 100 is used to log in to a service on the Internet will be exemplified.

In an embodiment of the present disclosure to be described below, a technology for performing an authentication function according to the public key authentication scheme even when no secret key is stored in an apparatus executing a web browser, and for switching between authentication using an ID and a password for each website and authentication using a response to a challenge will be exemplified.

Figure 9:
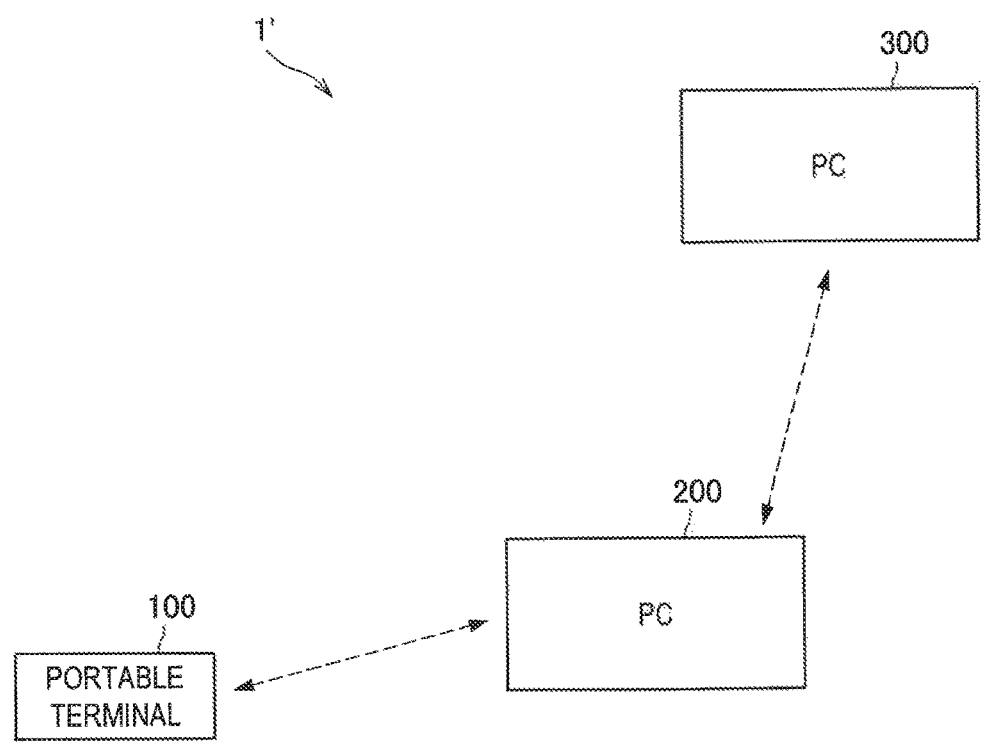
FIG. 9 is an explanatory diagram illustrating an example of the entire configuration of the information processing system 1 according to an embodiment of the present disclosure.

FIG. 9 is an explanatory diagram illustrating an example of the entire configuration of the information processing system 1 according to an embodiment of the present disclosure. Hereinafter, the example of the entire configuration of the information processing system 1 according to the embodiment of the present disclosure will be described with reference to FIG. 9.

As illustrated in FIG. 9, the information processing system 1 according to the embodiment of the present disclosure is configured to include a portable terminal 100, a PC 200, and a server apparatus 300. In the configuration illustrated in FIG. 9, the server apparatus 300 is added to the configuration illustrated in FIG. 1. In the embodiment, the server apparatus 300 is a web server that authenticates a user by causing a user of the PC 200 to input an ID and a password to a web browser executed by the PC 200 and provides a service for the authenticated user on the Internet.

Examples of services (web services) provided by the server apparatus 300 include a social networking service or a social networking system (SNS), a web mail service, and a net banking service.

The portable terminal 100 generates a pair of keys including a public key pk and a secret key sk, as in the above-described embodiment. Then, the portable terminal 100 supplies the PC 200 with the public key pk generated in response to a request from the PC 200. The PC 200 supplies the server apparatus 300 with the public key pk acquired from the portable terminal 100 for authentication in the server apparatus 300.

Then, the server apparatus 300 uses the public key pk in addition to authentication using an ID and a password transmitted from the PC 200 to perform authentication using a response transmitted in response to a challenge transmitted from the server apparatus 300 to the portable terminal 100 via the PC 200 and acquired from the portable terminal 100 by the PC 200.

The server apparatus 300 causes the PC 200 to display a screen for selecting the authentication using an ID and a password and the authentication using a response to a challenge when a user is authenticated. The server apparatus 300 causes the PC 200 to display a screen according to a result of the selection. The server apparatus 300 may not necessarily store a key in a web browser executed by the PC 200 by causing the authentication scheme to be selected for each website in this way and can switch between the authentication using an ID and a password and the authentication using a response to a challenge for each website.

The example of the entire configuration of the information processing system 1 according to the embodiment of the present disclosure has been described with reference to FIG. 9, Next, an example of a functional configuration of the server apparatus 300 according to the embodiment of the present disclosure will be described.

Figure 10:
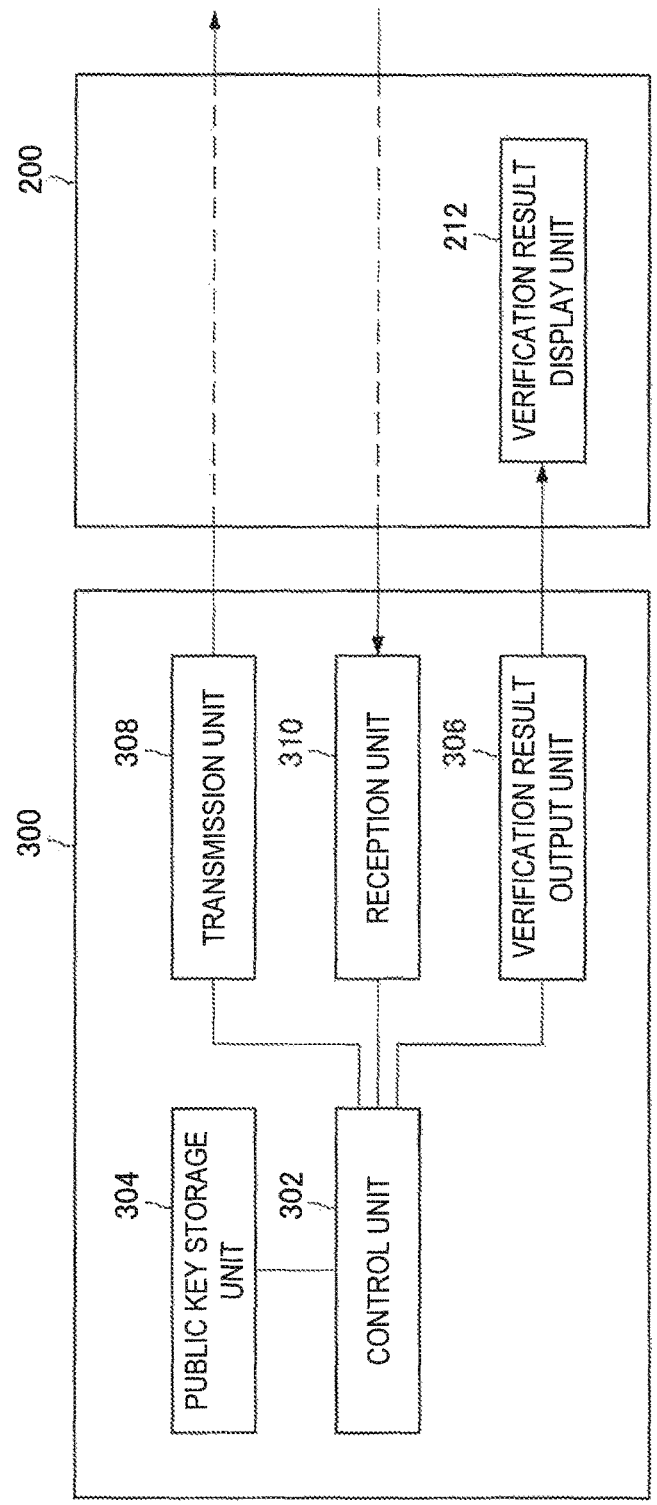
FIG. 10 is an explanatory diagram illustrating an example of a functional configuration of a server apparatus 300 according to an embodiment of the present disclosure.

FIG. 10 is an explanatory diagram illustrating an example of the functional configuration of the server apparatus 300 according to the embodiment of the present disclosure. In FIG. 10, an example of a functional configuration of the PC 200 according to the embodiment of the present disclosure is also illustrated. Hereinafter, the example of the functional configuration of the server apparatus 300 according to the embodiment of the present disclosure will be described with reference to FIG. 10.

As illustrated in FIG. 10, the server apparatus 300 according to the embodiment of the present disclosure is configured to include a control unit 302, a public key storage unit 304, a verification result output unit 306, a transmission unit 308, and a reception unit 310. As illustrated in FIG. 10, the PC 200 according to the embodiment of the present disclosure is configured to include a verification result display unit 212.

The control unit 302 controls an operation of the server apparatus 300. The public key storage unit 304 stores the public key pk as one of the pair of keys including the public key pk and the secret key sk generated by the portable terminal 100. When an authentication request is transmitted from the server apparatus 300 and a reply to the authentication request is transmitted from the portable terminal 100 via the PC 200, the verification result output unit 306 outputs a verification result to the reply to the verification result display unit 212 of the PC 200. The verification result display unit 212 of the PC 200 acquires the verification result output from the verification result output unit 306 of the server apparatus 300 and displays the verification result at a predetermined position of a screen.

The transmission unit 308 transmits information to the PC 200. The information transmitted to the PC 200 by the transmission unit 208 includes, for example, a registration request of the public key pk or the authentication request using the public key pk retained in the public key storage unit 304.

The reception unit 310 receives the information transmitted from the PC 200. The information received from the PC 200 by the reception unit 310 includes, for example, the public key pk transmitted in response to the registration request of the public key pk or a reply transmitted in response to the authentication request using the public key pk.

With such a configuration, the server apparatus 300 according to the embodiment of the present disclosure can authenticate the user using the PC 200 through authentication using a response to a challenge when the user is authenticated.

When the server apparatus 300 transmits the authentication request from the transmission unit 308, predetermined signature information may be added to the challenge and may be transmitted. When the server apparatus 300 adds the predetermined signature information to the challenge and transmits the challenge, the portable terminal 100 can be caused to reply a response including the signature information. Then, the server apparatus 300 can determine whether or not the challenge is the challenge generated by the server apparatus 300 by confirming the signature information included in the response.

The example of the functional configuration of the server apparatus 300 according to the embodiment of the present disclosure has been described above with reference to FIG. 10. Next, an example of a login screen of a web service provided by the server apparatus 300 according to an embodiment of the present disclosure will be described.

Figure 11:
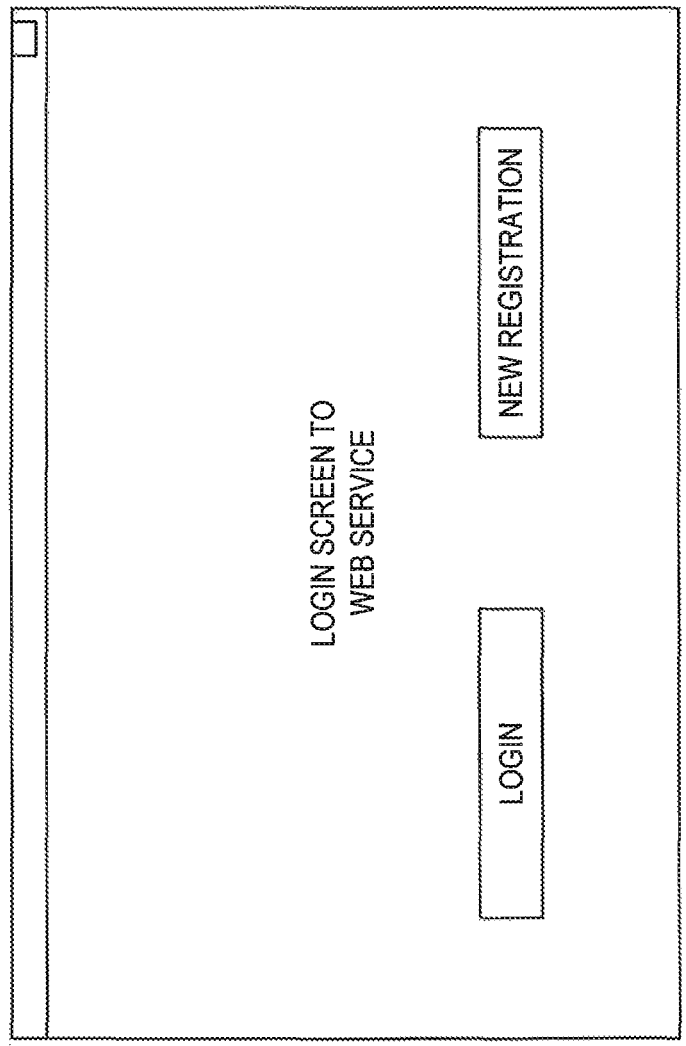
FIG. 11 is an explanatory diagram illustrating an example of a login screen of a web service provided by the server apparatus 300 according to an embodiment of the present disclosure.
Figure 12:
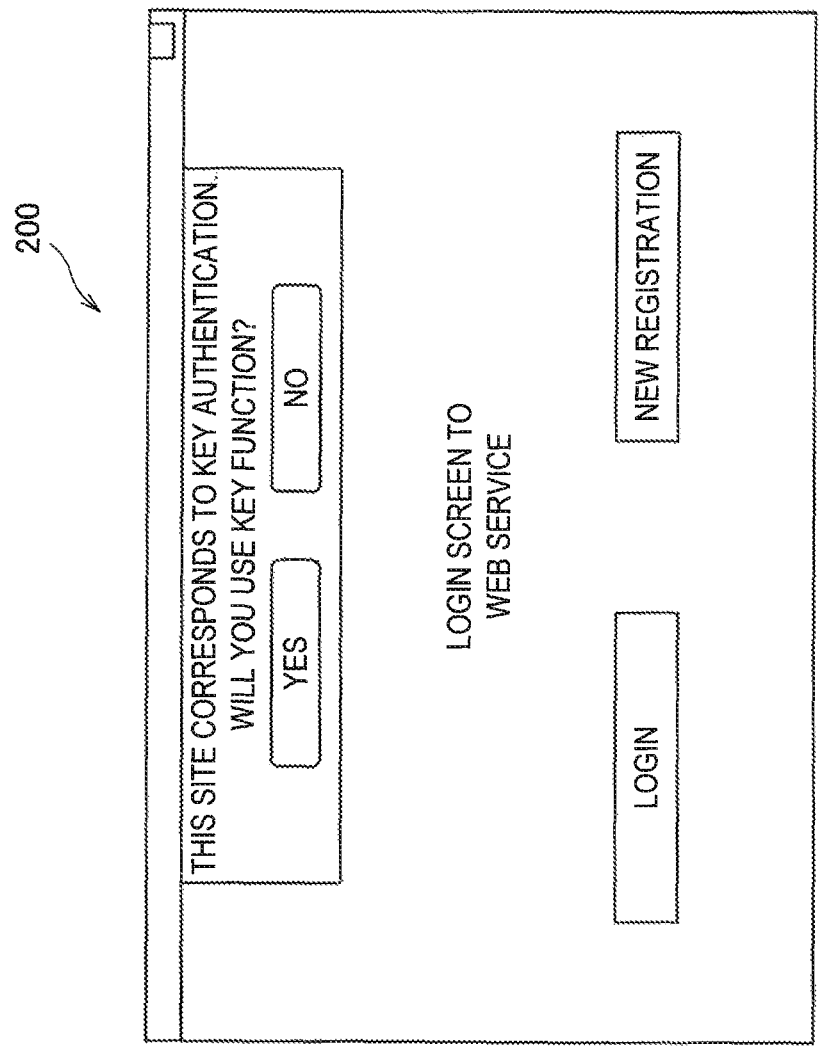
FIG. 12 is an explanatory diagram illustrating an example of a login screen of a web service provided by the server apparatus 300 according to an embodiment of the present disclosure.

FIGS. 11 and 12 are explanatory diagrams illustrating an example of a login screen of a web service provided by the server apparatus 300 according to an embodiment of the present disclosure and an example of a login screen displayed on the screen of the PC 200 when the PC 200 accesses the server apparatus 300.

FIG. 11 illustrates an example of a screen displayed on the screen of the PC 200 when a web service provided by the server apparatus 300 does not correspond to a public key authentication scheme. On the other hand, FIG. 12 illustrates an example of a screen displayed on the screen of the PC 200 when a web service provided by the server apparatus 300 corresponds to the public key authentication scheme.

As illustrated in FIG. 12, when the web service provided by the server apparatus 300 corresponds to the public key authentication scheme, the server apparatus 300 presents the fact that the web service corresponds to the public key authentication scheme on a login screen. The user of the PC 200 can see the login screen on which the fact that web service corresponds to the public key authentication scheme is presented and select the authentication using an ID and a password and the authentication using a response to a challenge.

Of course, it is needless to say that the login screen of the web service provided by the server apparatus 300 is not limited to the related example.

The example of the login screen of the web service provided by the server apparatus 300 according to the embodiment of the present disclosure has been described. Next, a modification example of the portable terminal 100 in which a secret key is stored will be described.

Figure 13:
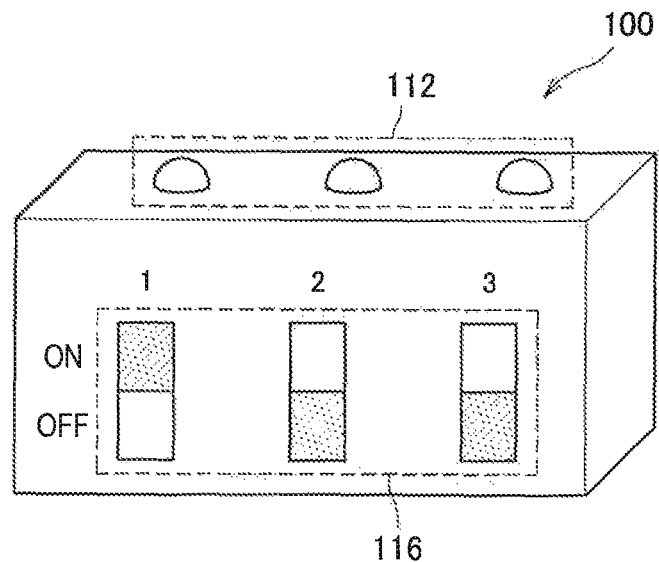
FIG. 13 is an explanatory diagram illustrating a modification example of the portable terminal 100 according to an embodiment of the present disclosure.
Figure 14:
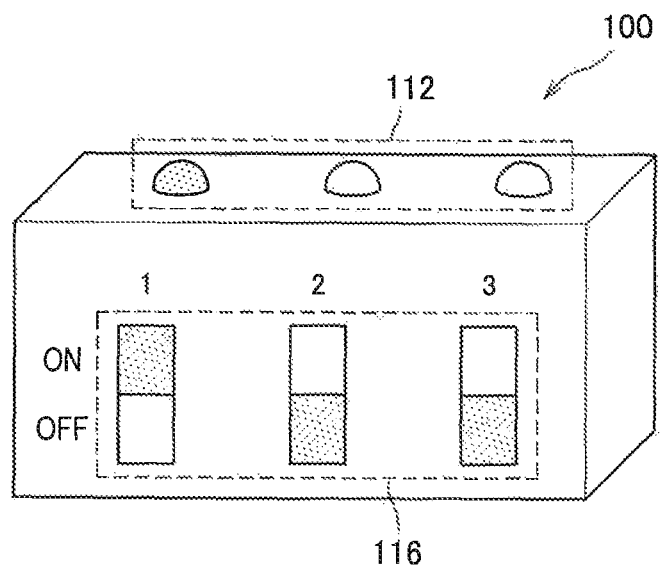
FIG. 14 is an explanatory diagram illustrating another modification example of the portable terminal 100 according to an embodiment of the present disclosure.

FIGS. 13 and 14 are explanatory diagrams illustrating a modification example of the portable terminal 100 according to an embodiment of the present disclosure. The portable terminal 100 according to the embodiment of the present disclosure may have, for example, an outer appearance illustrated in FIGS. 13 and 14.

The key use permission switch unit 116 in FIGS. 13 and 14 is assumed to switch use permission of secret keys corresponding to numbers by turning switches on and off. In the example illustrated in FIG. 13, the secret key corresponding number 1 is permitted to be used. When the secret key corresponding to this number is used, the key use time notification unit 112 in FIGS. 13 and 14 notifies the user of the use of the secret key through lighting. Accordingly, the key use time notification unit 112 may be configured to include, for example, a light-emitting diode (LED).

When the secret key stored in the portable terminal 100 is used, as illustrated in FIG. 14, the portable terminal 100 lights a portion corresponding to the used secret key in the key use time notification unit 112. By causing the key use time notification unit 112 to light in this way, the portable terminal 100 can present the use of the secret key to the user.

3. EXAMPLE OF HARDWARE CONFIGURATION

Figure 15:
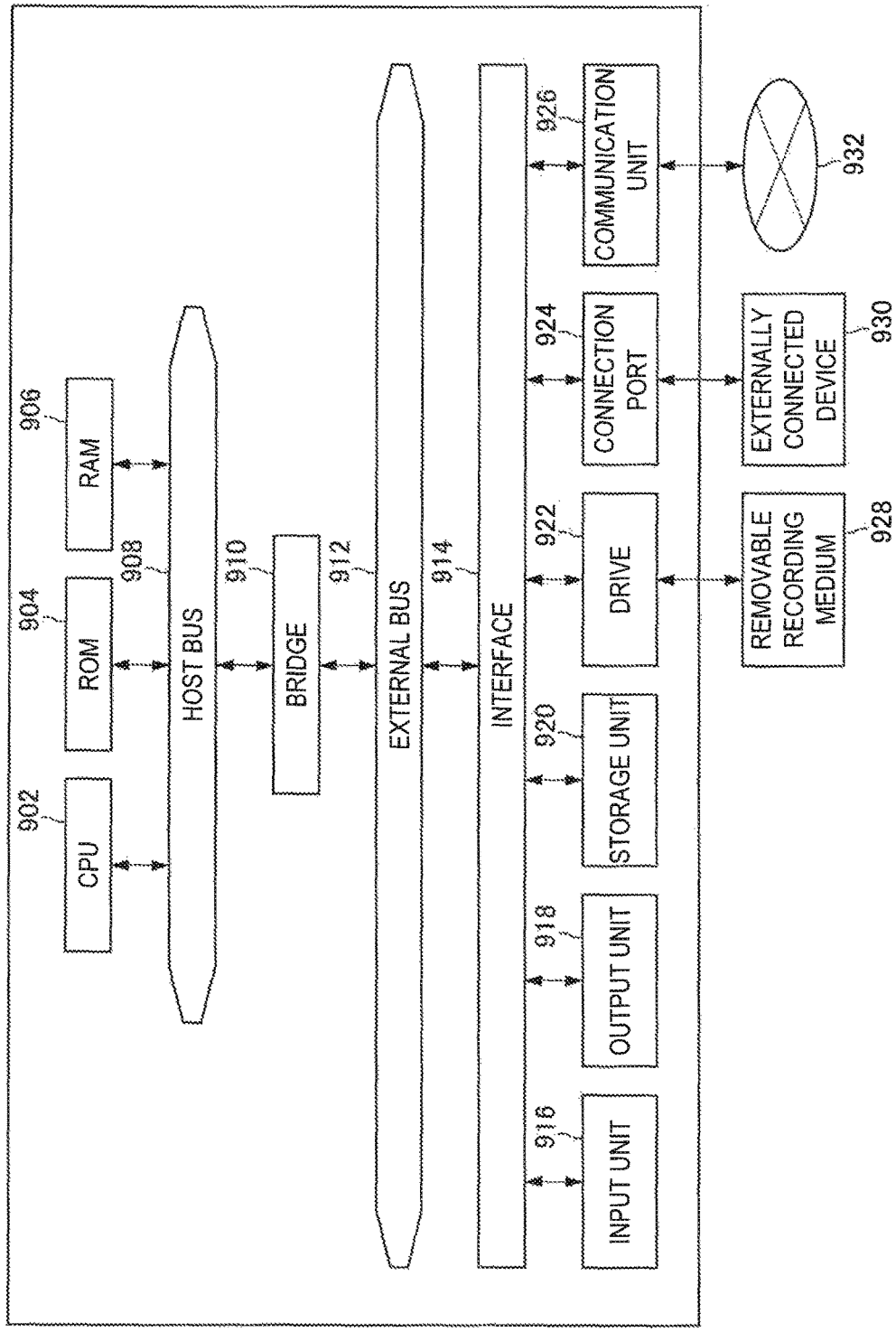
FIG. 15 is an explanatory diagram illustrating an example of a hardware configuration.

Each algorithm described above can be performed by using, for example, the hardware configuration of the information processing apparatus shown in FIG. 15. That is, processing of each algorithm can be realized by controlling the hardware shown in FIG. 15 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 15, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removable recording medium 928. The ROM 904 is a storing mechanism, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE 1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

For example, when the portable terminal 100 has the hardware configuration, for example, the CPU 902 can have the functions of the control unit 102 and the key generation unit 104. For example, the input unit 916 can have the functions of the key input unit 106, the key selection unit 110, and the key use permission switch unit 116. For example, the ROM 904, the RAM 906, the storage unit 920, or the removable recording medium 928 can have the function of the key storage unit 108 and the key use permission state storage unit 114 and the function of the key use time notification unit 112 and the key use permission state storage unit 114. For example, the output unit 918 can have the function of the key use permission state display unit 118. For example, the communication unit 926 can have the functions of the reception unit 120 and the transmission unit 122.

4. CONCLUSION

As described above, according to an embodiment of the present disclosure, there is provided the portable terminal 100 capable of retaining the plurality of secret keys sk. Since the portable terminal 100 according to the embodiment of the present disclosure has the configuration illustrated in FIG. 2, one secret key sk among the plurality of secret keys sk retained in the key storage unit 108 can be set to enter the selection state. Also, since the portable terminal 100 according to the embodiment of the present disclosure has the configuration illustrated in FIG. 2, the use permission or non-permission can be set in each of the plurality of the secret keys sk retained in the key storage unit 108 and the use permission or non-permission state thereof can be indicated.

According to an embodiment of the present disclosure, there is provided the PC 200 or the server apparatus 300 performing user authentication using a public key provided from the portable terminal 100.

The steps in the processes performed by each apparatus in the present specification may not necessarily be processed chronologically in the orders described in the sequence diagrams and the flowcharts. For example, the steps in the processes performed by each apparatus may be processed in different orders from the orders described in the flowcharts or may be processed in parallel.

Also, a computer program causing hardware such as a CPU, a ROM, and a RAM included in each apparatus to carry out the equivalent functions as the above-described configuration of each apparatus can be generated. Also, a storage medium having the computer program stored therein can be provided. Also, by configuring each functional block illustrated in the functional block diagram as hardware, the series of processes can also be realized by the hardware. Also, the computer program can be distributed as a dedicated application program for various information processing terminals such as smartphones or tablets from a predetermined application distribution site on a network such as the Internet. The application distribution site can be provided by a server apparatus including a storage apparatus that stores a program and a communication apparatus that transmits the application program in response to a download request from clients (various information processing terminals such as smartphones or tablets).

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Additionally, the present technology may also be configured as below.

(1)

An information processing apparatus including:

a key storage unit configured to retain one or more secret keys corresponding to one or more respective public keys; and a key use permission state storage unit configured to store presence or absence of use permission of each of the one or more secret keys, wherein, for at least any of the one or more secret keys, a switch between the presence and absence of the use permission stored by the key use permission state storage unit is possible.

(2)

The information processing apparatus according to (1), further including:

a key use permission switch unit configured to switch the presence and absence of the use permission stored by the key use permission state storage unit for each of the one or more secret keys.

(3)
The information processing apparatus according to (2),
wherein the key use permission switch unit switches the presence and absence of the use permission after a user is authenticated using biological information regarding the user.
(4)
The information processing apparatus according to (2),
wherein the key use permission switch unit switches the presence and absence of the use permission after a user is authenticated using knowledge possessed by the user.
(5)
The information processing apparatus according to (2),
wherein the key use permission switch unit switches the presence and absence of the use permission after a user is authenticated using belongings owned by the user.
(6)
The information processing apparatus according to any of (2) to (5),
wherein the key use permission switch unit cancels the use permission of the secret key when the secret key permitted to be used is used after the use of each of the one or more secret keys is permitted.
(7)
The information processing apparatus according to any of (2) to (5),
wherein the key use permission switch unit cancels the use permission of the secret key when a predetermined time passes after the use of each of the one or more secret keys is permitted.
(8)
The information processing apparatus according to any of (2) to (7),
wherein the key use permission state storage unit permits the use of the secret key when an apparatus that has transmitted an authentication request for each secret key is registered.
(9)
The information processing apparatus according to (1), further including:
a key use notification unit configured to notify that any of the secret keys which is retained by the key storage unit and of which the use permission is stored by the key use permission state storage unit has been used.
(10)
The information processing apparatus according to any of (1) to (9), further including:
a key use permission state display unit configured to display information regarding the presence or absence of the use permission stored by the key use permission state storage unit.
(11)
The information processing apparatus according to any of (1) to (10), further including:
an interface configured to receive an input of at least one of the secret keys from a user.
(12)
The information processing apparatus according to any of (1) to (11),
wherein the key storage unit stores a history of an authentication request for each secret key.
(13)
An information processing apparatus including:
a key storage unit configured to store one or more public keys corresponding to one or more respective secret keys retained by an apparatus that issues an authentication request; and
a verification unit configured to supply first info illation to the apparatus, acquire, from the apparatus, second information generated using the secret key in regard to the first information, and verify the authentication request from the apparatus using the public key and the second information.
(14)
The information processing apparatus according to (13),
wherein the verification unit transmits, to the apparatus that issues the authentication request, the first information to which signature information has been added.
(15)
The information processing apparatus according to (13) or (14),
wherein the verification unit is able to switch authentication using the public key and authentication by knowledge possessed by a user.
(16)
An information processing method including:
retaining one or more secret keys corresponding to one or more respective public keys; and
storing presence or absence of use permission of each of the one or more secret keys,
wherein, for at least any of the one or more secret keys, a switch between the stored presence and absence of the use permission is possible.
(17)
An information processing method including:
storing one or more public keys corresponding to one or more respective secret keys retained by an apparatus that issues an authentication request; and
supplying first information to the apparatus, acquiring, from the apparatus, second information generated using the secret key in regard to the first information, and verifying the authentication request from the apparatus using the public, key and the second information.
(18)
A computer program causing a computer to perform:
retaining one or more secret keys corresponding to one or more respective public keys; and
storing presence or absence of use permission of each of the one or more secret keys,
wherein, for at least any of the one or more secret keys, a switch between the stored presence and absence of the use permission is possible.
(19)
A computer program causing a computer to perform:
storing one or more public keys corresponding to one or more respective secret keys retained by an apparatus that issues an authentication request; and
supplying first information to the apparatus, acquiring, from the apparatus, second information generated using the secret key in regard to the first information, and verifying the authentication request from the apparatus using the public key and the second information.

REFERENCE SIGNS LIST

1 information processing system
100 portable terminal
200 PC
300 server apparatus

The invention claimed is:
1. An information processing apparatus comprising:
a key storage unit configured to retain one or more secret keys corresponding to one or more respective public keys, wherein the one or more public keys are registered in another apparatus to perform authentication;

a key use permission state storage unit configured to store presence or absence of use permission of each secret key of the one or more secret keys, wherein, for each secret key of the one or more secret keys, a switch between the presence and absence of the use permission stored by the key use permission state storage unit is performed according to a manipulation of a user on a screen of the information processing apparatus; and a key use permission switch unit configured to switch between the presence and the absence of the use permission stored by the key use permission state storage unit for one or more selected secret keys of the one or more secret keys according to the manipulation of the user on the screen of the information processing apparatus, wherein the key storage unit, the key use permission state storage unit, and the key use permission switch unit are each implemented via at least one processor.

2. The information processing apparatus according to claim 1, wherein the key use permission switch unit switches between the presence and the absence of the use permission after the user is authenticated using biological information regarding the user.

3. The information processing apparatus according to claim 1, wherein the key use permission switch unit switches between the presence and the absence of the use permission after the user is authenticated using knowledge possessed by the user.

4. The information processing apparatus according to claim 1, wherein the key use permission switch unit switches between the presence and the absence of the use permission after the user is authenticated using belongings owned by the user.

5. The information processing apparatus according to claim 1, wherein the key use permission switch unit cancels the use permission of the secret key when the secret key permitted to be used is used after the use of each of the one or more secret keys is permitted.

6. The information processing apparatus according to claim 1, wherein the key use permission switch unit cancels the use permission of the secret key when a predetermined time passes after the use of each of the one or more secret keys is permitted.

7. The information processing apparatus according to claim 1, wherein the key use permission state storage unit permits the use of the secret key when an apparatus that has transmitted an authentication request for each secret key is registered.

8. The information processing apparatus according to claim 1, further comprising:

a key use notification unit configured to notify that any of the secret keys which is retained by the key storage unit and of which the use permission is stored by the key use permission state storage unit has been used, wherein the key use notification unit is implemented via at least one processor.

9. The information processing apparatus according to claim 1, further comprising:

a key use permission state display unit configured to display information regarding the presence or the absence of the use permission stored by the key use permission state storage unit, wherein the key use permission state display unit is implemented via at least one processor.

10. The information processing apparatus according to claim 1, further comprising:

an interface configured to receive an input of at least one of the secret keys from the user.

11. The information processing apparatus according to claim 1, wherein the key storage unit stores a history of an authentication request for each secret key.

12. An information processing apparatus comprising:

a key storage unit configured to store one or more public keys corresponding to one or more respective secret keys retained by an apparatus that issues an authentication request; and a verification unit configured to supply first information to the apparatus, acquire, from the apparatus, second information generated using the secret key in regard to the first information, and verify the authentication request from the apparatus using the public key and the second information.

13. The information processing apparatus according to claim 12, wherein the verification unit transmits, to the apparatus that issues the authentication request, the first information to which signature information has been added.

14. The information processing apparatus according to claim 12, wherein the verification unit is able to switch authentication using the public key and authentication by knowledge possessed by the user.

15. An information processing method, implemented via an information processing apparatus including at least one processor, the method comprising:

retaining one or more secret keys corresponding to one or more respective public keys, wherein the one or more public keys are registered in another apparatus to perform authentication;

storing presence or absence of use permission of each secret key of the one or more secret keys, wherein, for each secret key of the one or more secret keys, a switch between the stored presence and the stored absence of the use permission is performed according to a manipulation of a user on a screen of the information processing apparatus; and switching between the presence and the absence of the use permission stored for one or more selected secret keys of the one or more secret keys according to the manipulation of the user on the screen of the information processing apparatus.

16. An information processing method comprising:

storing one or more public keys corresponding to one or more respective secret keys retained by an apparatus that issues an authentication request; and supplying first information to the apparatus, acquiring, from the apparatus, second information generated using the secret key in regard to the first information, and verifying the authentication request from the apparatus using the public key and the second information.

17. A non-transitory computer-readable medium having embodied thereon a program, which when executed by a computer causes the computer to execute a method, the method comprising:

retaining one or more secret keys corresponding to one or more respective public keys, wherein the one or more public keys are registered in another apparatus to perform authentication;

storing presence or absence of use permission of each secret key of the one or more secret keys, wherein, for each secret key of the one or more secret keys, a switch between the stored presence and the stored absence of the use permission is performed according to a manipulation of a user on a screen of the computer; and switching the presence and the absence of the use permission stored for one or more selected secret keys of the one or more secret keys according to the manipulation of the user on the screen of the computer.

18. A computer program causing a computer to perform:

storing one or more public keys corresponding to one or more respective secret keys retained by an apparatus that issues an authentication request; and supplying first information to the apparatus, acquiring, from the apparatus, second information generated using the secret key in regard to the first information, and verifying the authentication request from the apparatus using the public key and the second information.

19. The information processing apparatus according to claim 9, wherein the key use permission state display unit changes the display information based on the switch between the presence and the absence of the use permission for the one or more selected secret keys according to the manipulation of the user on the screen of the information processing apparatus.

\* \* \* \* \*